United States Patent [19]
Peters, Jr.

[11] 3,898,410
[45] Aug. 5, 1975

[54] AC TO RF CONVERTER CIRCUIT FOR INDUCTION COOKING UNIT

[75] Inventor: Philip H. Peters, Jr., Greenwich, N.Y.

[73] Assignee: Environment/One Corporation, Schenectady, N.Y.

[22] Filed: June 16, 1972

[21] Appl. No.: 263,639

[52] U.S. Cl. ........ 219/10.49; 219/10.77; 219/10.79; 317/2 R; 321/18
[51] Int. Cl. ............................................ H05b 5/04
[58] Field of Search........... 219/10.49, 10.75, 10.77, 219/10.79, 501, 502; 321/10, 18, 43; 307/272

[56] References Cited
UNITED STATES PATENTS

| | | | |
|---|---|---|---|
| 2,321,587 | 6/1943 | Davie | 317/2 |
| 3,335,212 | 8/1967 | Seuley | 219/10.75 UX |
| 3,566,243 | 2/1971 | Landis | 219/10.77 UX |
| 3,585,491 | 1/1971 | Petersen | 321/43 X |
| 3,596,165 | 7/1971 | Andrews | 321/18 |
| 3,637,970 | 1/1972 | Cunningham | 219/10.75 |
| 3,770,928 | 11/1973 | Kornrumps | 219/10.49 |
| 3,775,577 | 11/1973 | Peters | 219/10.49 |
| 3,781,503 | 12/1973 | Haonden | 219/10.49 |

FOREIGN PATENTS OR APPLICATIONS

| | | | |
|---|---|---|---|
| 1,068,031 | 5/1967 | United Kingdom | 219/10.49 |

*Primary Examiner*—Bruce A. Reynolds
*Attorney, Agent, or Firm*—Charles W. Helzer

[57] ABSTRACT

A first feedback path is connected across one of the commutating reactive components of an induction cooking unit chopper inverter for deriving a first high frequency alternating current gate controlling signal voltage at substantially the operating frequency of the chopper-inverter. A second feedback path is connected to the high voltage power supply terminals for deriving a second alternating current gate controlling signal voltage at the frequency of the high voltage potential appearing across the high voltage power supply terminals including the low frequency, undulating, full wave rectified 120 hertz excitation potential component supplied by the full wave rectifier bridge. A gating signal generator is provided for deriving high frequency output gating signal pulses of sufficient magnitude to assure safe turn-on of the power rated thyristor and is energized from the low voltage direct current power supply. A first control switch is coupled to and enables operation of the gating signal generator and includes a direct current bias circuit supplied from the low voltage direct current power supply for supplying direct current bias potential to the first control switch. A common alternating current coupling path comprising a differentiating circuit supplied with both the first feedback high frequency alternating current gate controlling signal voltage and the second feedback alternating current gate controlling signal voltage, differentiates the two feedback gate controlling signals and supplies the differentiated output in common to the first control switch to control operation of the first control switch in conjunction with the direct current bias potential. The circuit arrangement provides zero point switching during initial turn-on of the thyristor at or near the zero point of the high voltage full wave rectified excitation potential supplied across the high voltage power supply terminals, and both unity power factor and unity form factor operation whereby sinusoidal line current is drawn for all values of loading from no-load to full-load and without requiring substantial supply line filtering components.

51 Claims, 29 Drawing Figures

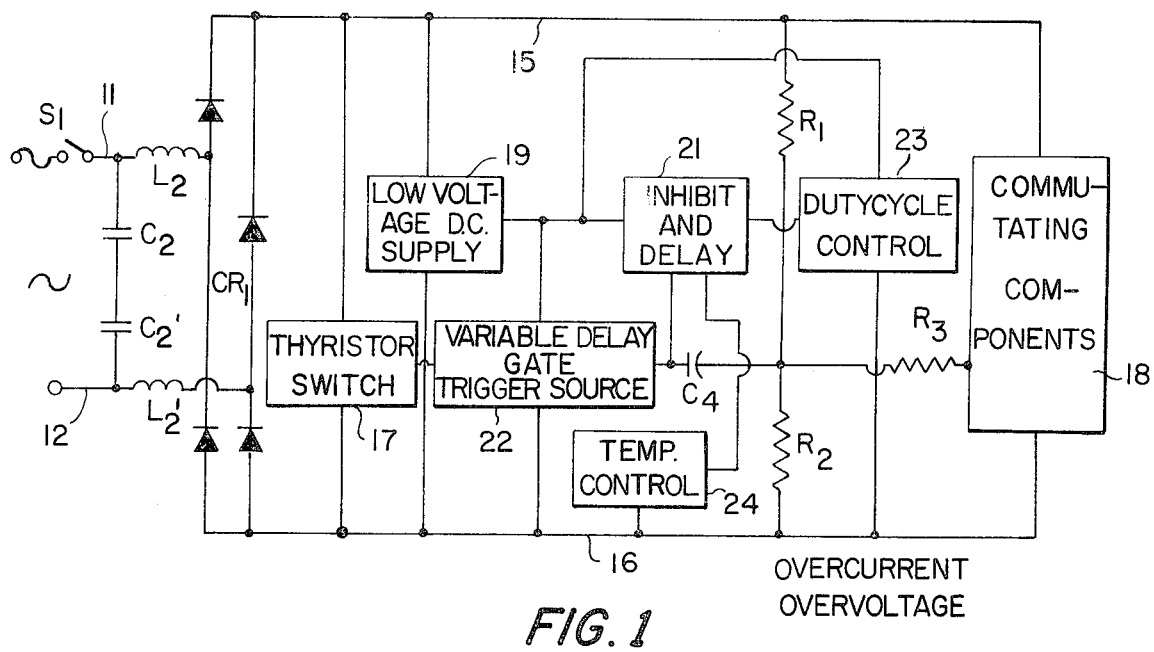
FIG. 1
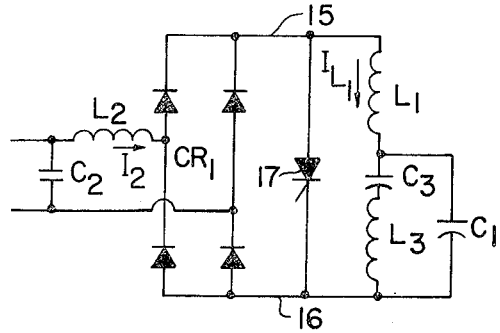
FIG. 4a
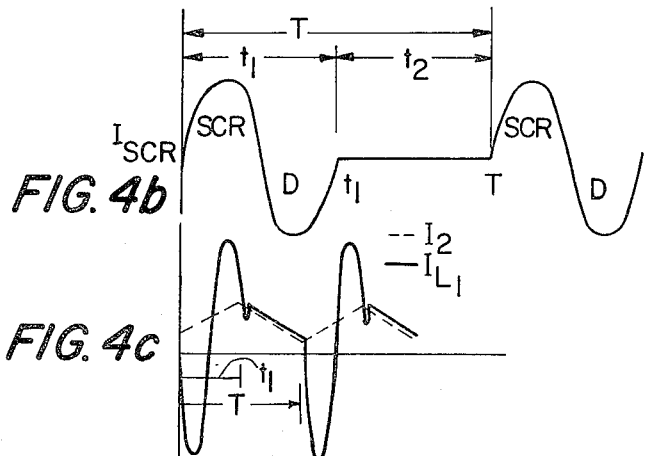
FIG. 4b
FIG. 4c
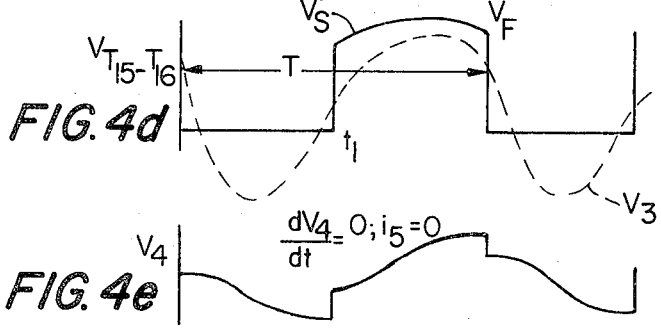
FIG. 4d
FIG. 4e
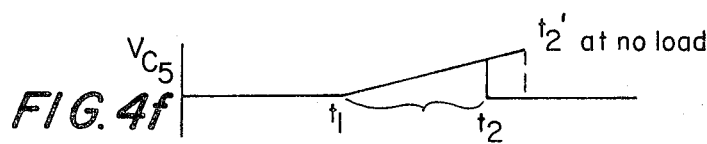
FIG. 4f

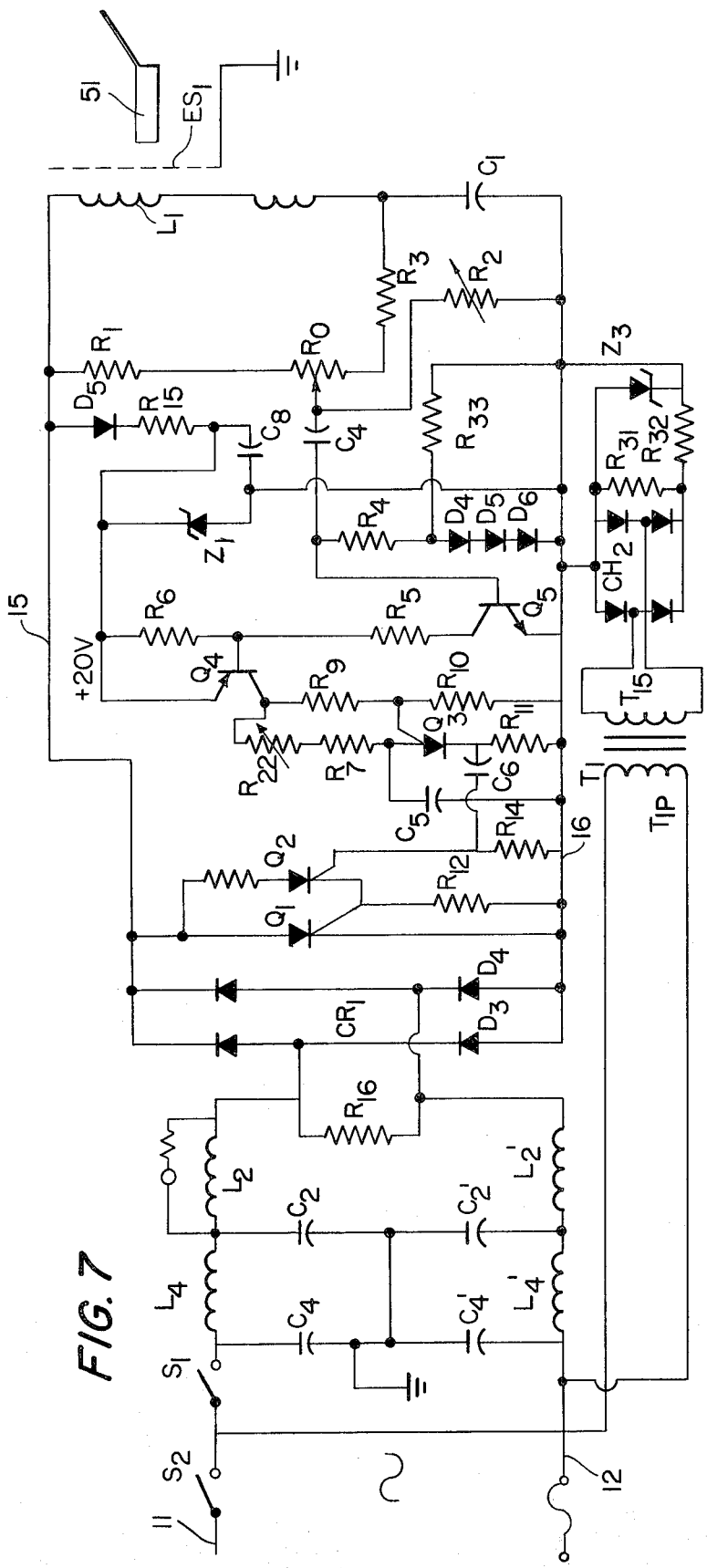
FIG. 7
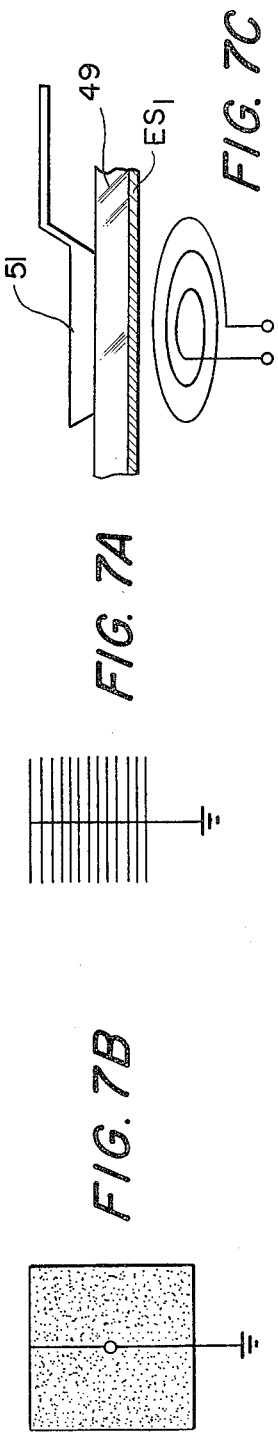
FIG. 7A
FIG. 7B
FIG. 7C

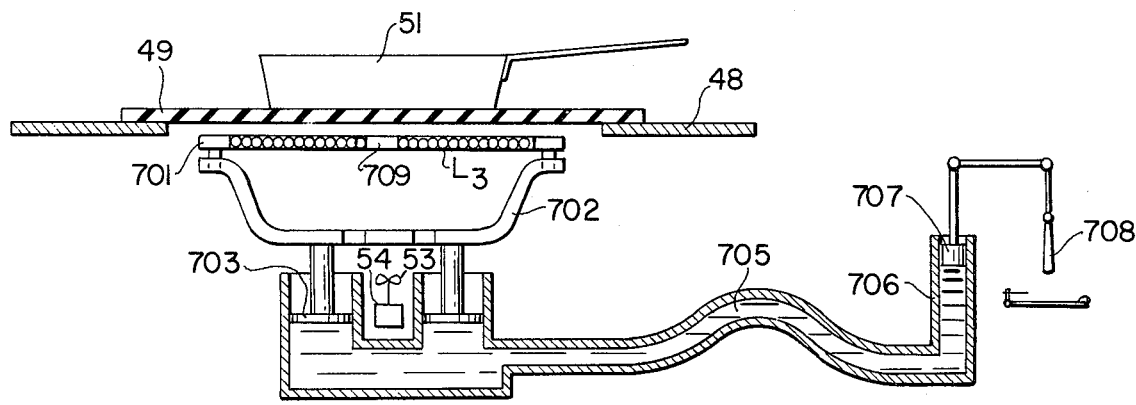
FIG. 8
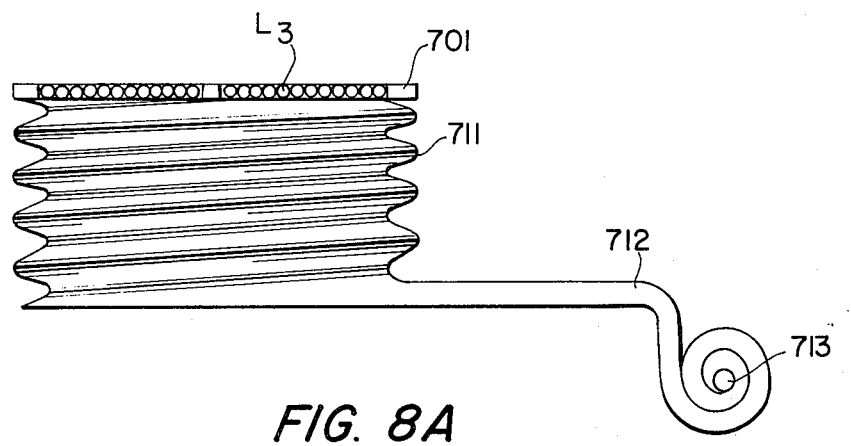
FIG. 8A
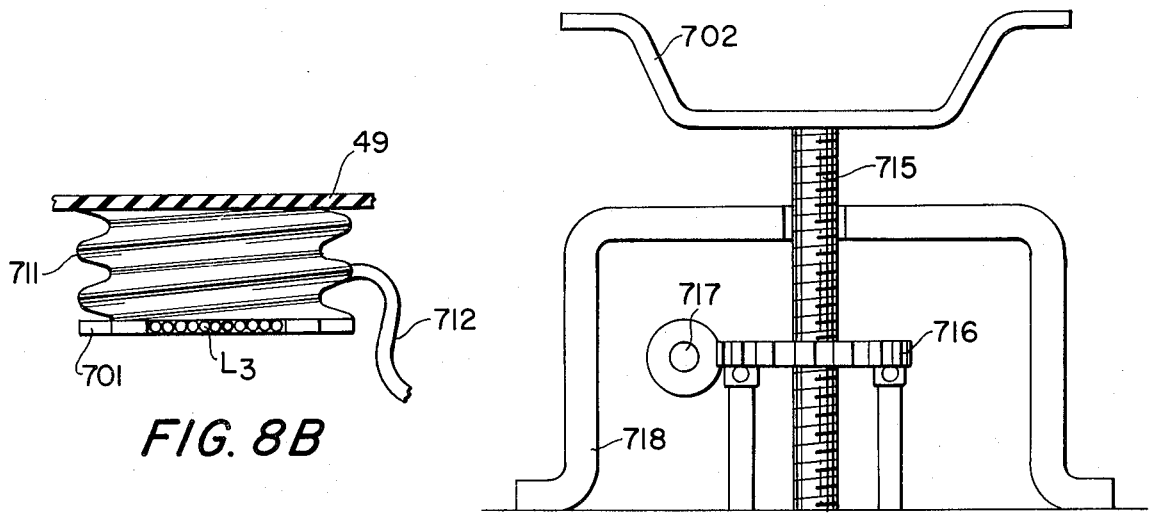
FIG. 8B
FIG. 8C

AC TO RF CONVERTER CIRCUIT FOR INDUCTION COOKING UNIT

BACKGROUND OF THE INVENTION

1. Field of the Invention

This invention relates to a new and improved alternating current to high frequency induction cooking unit power supply.

More particularly the invention relates to an improved induction cooking unit power supply of the type which directly converts conventional alternating current to a high frequency current of the order of 20–30 kilohertz for exciting an induction heating coil for a domestic cooking range or the like. The induction heating coil, upon being thus excited produces a rapidly changing magnetic induction field that quickly and efficiently generates heat in a metal base cooking utensil disposed over the coil.

2. Background Problem

In copending United States patent application Ser. No. 131,648 now U.S. Pat. No. 3,710,062, filed Apr. 6, 1971, Philip H. Peters, Jr., inventor, assigned to the Environment/One Corporation, a metal base cookware induction heating apparatus is described having an improved power supply and gating control circuit and which uses an infra-red temperature sensor and improved heating coil arrangement. The metal base cookware induction heating apparatus described in copending application Ser. No. 131,648, now U.S. Pat. No. 3,710,062, is satisfactory for many applications; however, the apparatus does possess certain limitations which constrain its use to particular types of lossy ferromagnetic, metal base cookware. Additionally, large numbers of such apparatus employed in a residential neighborhood could have a deleterious effect on the power transmission services of local utilities, or in any event would make their job of supplying electrical service more difficult. Further, a preferred manner in which power derived from the apparatus could be varied to thereby control the inductive heating process in a desired manner, involved switching of commutating capacitor components that, in turn, required relatively expensive switching devices to assure safe switching. In order to minimize these and other problems associated with the prior art apparatus, the present invention was devised.

SUMMARY OF INVENTION

It is therefore a primary object of the present invention to provide an improved, low cost and efficient A.C. to R.F. induction cooking unit power supply for use primarily in domestic cooking ranges for inductively heating metal base cookware made from ferromagnetic materials but which will operate safely if used with other available cookware made from aluminum, copper or other highly conductive materials.

Another object of the invention is to provide such an induction cooking unit power supply which operates at substantially unity power factor and unity form factor for all values of loading from no-load to full-load.

A further object of the invention is to provide an improved induction cooking unit power supply having the above set forth characteristics and which provides linear control of the output power developed by the power supply from 0 to 100% of full power in a smooth stepless manner.

A still further object of the invention is to provide an induction cooking unit power supply having all of the above characteristics which can be readily adapted to either low or high power operation, which is relatively simple and inexpensive to manufacture and operate, and which operates reliably and safely with minimal ratio frequency interference emissions.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several Figures are identified by the same reference character, and wherein:

FIG. 1 is a functional block diagram of an improved alternating current to radio frequency power supply circuit for induction cooking units constructed in accordance with the invention;

FIG. 4(a) is a diagrammatic sketch and FIGS. 4(b) through 4(f) are accompanying voltage versus time characteristic wave forms plotted on a 20–30 kilohertz time scale illustrating the manner of operation of the improved AC to RF chopper-inverter shown in FIG. 2;

FIG. 7 is a detailed schematic circuit diagram of still another embodiment of the invention which requires only a single commutating coil that also serves as the induction heating coil and a single commutating capacitor and further provides electro-static shielding for inductively heated cookware;

FIG. 7A is a schematic illustration of one form of fabricating the electro-static shield employed in the arrangement of FIG. 7;

FIG. 7B illustrates a different manner of fabricating the electro-static shield of FIG. 7;

FIG. 7C is a side sectional view of an insulating support member for induction heated cookware used with the unit and shows the manner in which the electro-static shielding structures of 7A and 7B can be formed by deposition of conductors on the under surface of the insulating support member;

FIGS. 8, 8A, 8B, 8C, 8D, 8E, 8F and 8G of the drawings show different structural arrangements for mechanically moving an induction heating coil relative to a pan or other metal base cookware to be inductively heated, and wherein movement of the coil toward and away from the metal base cookware provides power control over the amount of induction heating achieved.

DETAILED DESCRIPTION OF PREFERRED EMBODIMENTS

Figure 2:
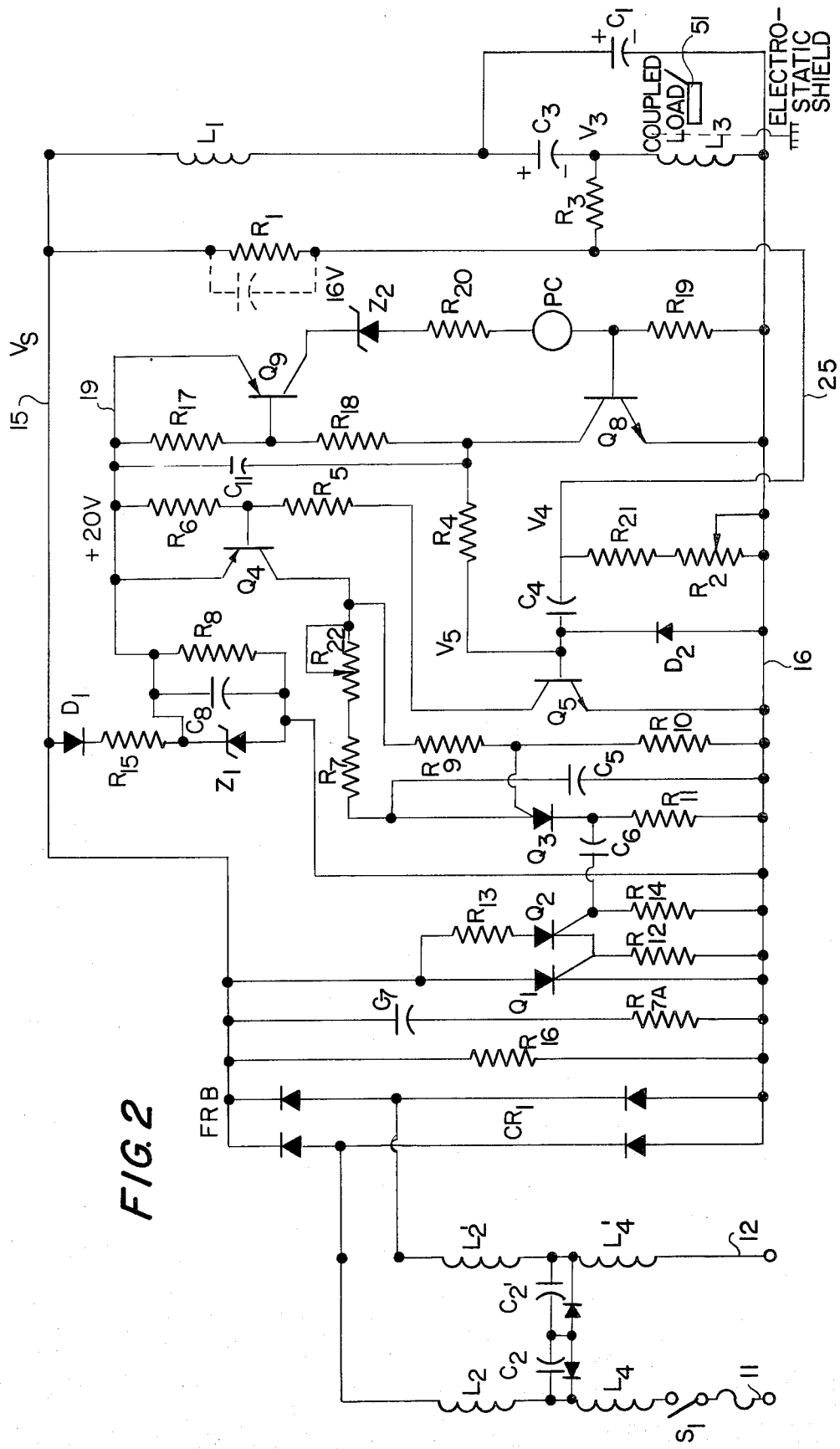
FIG. 2 is a detailed schematic circuit diagram illustrating the basic features of construction of an improved AC to RF chopper-inverter circuit comprising the power supply shown in FIG. 1.

FIG. 1 is a functional block diagram of a new and improved AC to RF induction heating unit power supply constructed in accordance with the invention. In FIG. 1, a pair of high voltage power supply terminals 15 and 16 are supplied with a low frequency, high voltage, undulating excitation potential in the form of a full wave rectified voltage appearing at the output of a full wave rectifier bridge $CR_1$. Bridge $CR_1$ is supplied through a conventional on-off switch $S_1$ and suitable fuse (not shown) from a conventional alternating current residential or commercial source of alternating current (A.C.) potential connected across the input conductors 11 and 12. Filter inductors fabricated in two parts $L_2$ and $L_2'$, are connected in the respective supply line connections 11 and 12 to the two legs of the diode rectifier bridge $CR_1$, and a pair of back to back high frequency filter capacitors $C_2$ and $C_2'$ of relatively low cost are connected across alternating current supply lines 11 and 12 to bypass high frequency current flowing through $L_2$ and $L_2'$. The filter inductors $L_2$ and $L_2'$ are relatively low cost, air core windings which provide comparatively little or no filtering at the supply line frequency, but do present a high impedance to the high radio frequency (20–30 kilohertz) at which the chopper-inverter power supply operates.

The chopper-inverter power circuit is further comprised by serially connected capacitor and inductor commutating reactive components shown generally at 18 with the commutating inductor reactive components comprising an induction heating coil. A power rated thyristor switch 17 has its load terminals connected across the high voltage power supply terminals 15 and 16 in parallel circuit relationship with the commutating reactive components 18 and preferably comprises a silicon controlled rectifier (hereinafter referred to as an SCR). A low voltage direct current power supply 19 derives its power from across the high voltage power supply terminals 15 and 16, and provides low voltage d.c. excitation to the gating circuit for the high voltage thyristor switch 17. The gating circuit is comprised by a variable delay, gate trigger source 22 having its output connected to the gating electrode of the thyristor switch 17. The variable delay, gate trigger source 22 operates to control gating-on of the power rated thyristor switch 17 which (upon repetitive turn-on by the gate trigger source 22), operates in the normal manner of a serially-commutated, chopper-inverter to supply high frequency current through the induction heating coil comprising a part of the commutating reactive components 18.

The overall gating circuit means of which the variable delay, gate trigger source 22 is a part, is further comprised by means including resistor $R_3$ connected across one of the reactive commutating components for deriving a first, high frequency, alternating current, gate controlling signal voltage at substantially the operating frequency of the chopper-inverter. An additional means comprising resistor $R_1$ is connected to the high voltage power supply terminals 15 and 16 for deriving a second, alternating current, gate controlling signal voltage at the frequency of the high voltage potential appearing across the high voltage power supply terminals 15 and 16 and including the low frequency, undulating, excitation potential component supplied from full wave rectifier $CR_1$. Common alternating current coupling means comprising a capacitor $C_4$ and resistor $R_2$, which comprise a differentiating coupling circuit, couple the first, high frequency, alternating current, gate controlling signal voltage derived through resistor $R_3$ and the second alternating current gate controlling signal voltage derived through resistor $R_1$ in common to control the operation of the variable delay gate trigger source 22 in conjunction with a direct current bias potential applied from the low voltage direct current power supply 19. The combination of these gate controlling signal voltages cause the variable delay gate trigger source 22 to turn-on thyristor switch 17 at or near the zero points of the high voltage undulating excitation potential supplied across terminals 15 and 16 during initial turn-on of the circuit, and upon turn-off, cause prolonged turn-off of the thyristor switch 17 beyond an operating cycle of the chopper-inverter, to occur only at or near the zero point of the high voltage, low frequency, undulating excitation potential component appearing across supply terminals 15 and 16. In this manner, unity power factor operation of the induction heating unit power supply is achieved with unity form factor having nearly sinusoidal line current drawn for all values of loading from no-load to full-load and without requiring substantial supply line filtering components. The manner in which this is accomplished will be better understood following the detailed description of FIG. 2 hereinafter.

In FIG. 2 of the drawings, a conventional, alternating current supply is connected through terminals 11 and 12 across a main on-off switch $S_1$ and high frequency filter components $L_2$ and $C_2$ to the full wave rectifier bridge $CR_1$. For improved high frequency filtering action, additional high frequency filter inductor elements $L_4$ and $L_4'$ may be connected in supply lines 11 and 12 on the alternating current supply side of filter capacitors $C_2$ and $C_2'$. The output of the full wave rectifier bridge $CR_1$ is supplied across the high voltage power supply terminals 15 and 16 through a resistor $R_{16}$ that serves as a charging load for the rectifier bridge. For the purpose of this description, it will be assumed that the conventional residential or commercial alternating current source connected to input supply lines 11 and 12 is a 120 volt, 15–20 amp, 60 hertz source, so that the high voltage, low frequency, undulating excitation potential appearing across supply terminals 15 and 16 would be a 120 hertz, full wave rectified potential having an average voltage value of about 108 volts. However, the invention is in no way restricted to use with such a supply source since by merely scaling up of the values of the components, or adding additional components, in the manner taught by FIG. 9A through 9C of the drawings, the circuit readily can be adapted for use with 240 volt, 30–50 amp, or other alternating current sources.

As is described more fully in the above referenced copending U.S. Patent application Ser. No. 131,648, now U.S. Pat. No. 3,710,062, the power supply comprises a high frequency chopper-inverter circuit including serially connected capacitor and inductor commutating reactive components $C_1$ and $L_1$ connected in series circuit relationship across the high voltage supply terminals 15 and 16. The series connected inductor and capacitor commutating reactive components having an inductance $L_1$ and a capacitance $C_1$ respectively, are connected in series circuit relationship across power supply terminals 15 and 16, and across power rated thyristor $Q_1$. Inductor $L_1$ and capacitor $C_1$ are tuned to series resonance at a desired commutating frequency that provides a combined thyristor conduction and commutating period $t_1$ during each cycle of operation of the chopper-inverter so as to provide an overall operating period T for the chopper-inverter including a quiescent charging period $t_2$ in each cycle of operation where $T = t_1 + t_2$ such that the value $\omega_2 t_2$ equals substantially $\pi/2$ radians at the operating frequency or greater, and where $\omega_2$ equals $$\sqrt{\frac{1}{L_2 C_1}}$$

where $L_2$ is the value of the inductance of the filter inductor $L_2$, $L_2'$. As a result of construction and operation of the chopper-inverter in this manner, the reapplied forward voltage across the thyristor $Q_1$ following each conduction interval will be maintained substantially independent of loading as described more fully in copending U.S. Pat. application Ser. No. 131,648, now U.S. Pat. No. 3,710,062.

The chopper-inverter circuit preferably further includes a smoothing inductor having an inductance $L_3$ and a smoothing capacitor having a capacitance $C_3$ connected in series circuit relationship across capacitor $C_1$ and comprising a part of the capacitor and inductor commutating reactive components. The inductor $L_3$ and the capacitor $C_3$ have impedance values such that the combined reactive impedance of the capacitor commutating reactive components including the smoothing inductor $L_3$ and the smoothing capacitor $C_3$ is capacitive in nature and series resonates with the inductor $L_1$ to establish the combined thyristor conduction and commutating period $t_1$. When constructed in this manner, the smoothing inductor $L_3$ and the capacitor $C_3$ shape the current flowing through the smoothing inductor $L_3$ to substantially a sinusoidal wave shape having little or no radio frequency interference emission effects, and the smoothing inductor $L_3$ comprises the induction heating coil of the unit. With the circuit thus comprised, and upon repetitive turn-on of the thyristor $Q_1$ by the gating circuit means associated with the thyristor and to be described hereinafter, the electric charge built up across the capacitor $C_1$ and $C_3$ by the high voltage supply potential appearing across terminals 15 and 16, alternately will be oscillated through inductors $L_1$ and $L_3$ in the normal manner of a serially commutated chopper-inverter to thereby supply high frequency current flow through the induction heating coil $L_3$. The high frequency, sinusoidally-shaped current flowing through induction heating coil $L_3$ will then magnetically induce rapid motion of the conduction carriers in a metal base cookware, shown schematically at 51, disposed over the induction heating coil to thereby heat the cookware as described more fully in the above-referenced U.S. Pat. application Ser. No. 131,648, now U.S. Pat. No. 3,710,062.

From a consideration of FIG. 2, it will be appreciated that thyristor $Q_1$ is a unidirectional conducting silicon control rectifier (SCR) of adequate power rating to accommodate the relatively high peak voltages (of the order of 400 volts) produced across supply terminals 15 and 16 during the peak values of the A. C. supply potential as a consequence of the resonant oscillations produced by the commutating reactive components. In order to accommodate the reverse currents produced as a consequence of the building up and collapse of magnetic lines of flux around the windings of the inductors $L_1$ and $L_3$, a power feedback diode connected in inverse parallel circuit relationship with SCR $Q_1$ normally is employed. However, in the present circuit, the full wave rectifier bridge $CR_1$ is comprised by fast recovery diodes which allow the $CR_1$ bridge to serve the dual function of a full wave rectifier of the supply alternating current potential, and also to provide feedback of reverse currents around the unidirectional conduction SCR thyristor $Q_1$. The fast recovery bridge also isolates the inductor $L_2$ from the commutating components $L_1$, $C_1$, $L_3$, $C_3$ in such a way that there can be no cyclic resonance of $L_2$ with these components to characterize a lower mode of oscillation of the inverter as there can be when there is no such isolation. This feature improves the stability of operation of the circuit during rapid start-up from low to high supply voltage. There are a number of commercially available fast recovery diodes and ready-made bridges on the market which are satisfactory for use as diode rectifier bridge $CR_1$. To complete the power chopper-inverter, a conventional snubbing circuit comprised by a resistor $R_{7A}$ and capacitor $C_7$ is connected in series circuit relationship across SCR $Q_1$ for limiting the $dv/dt$ effects of the reapplied forward voltage across SCR $Q_1$ following turn-off.

The gating circuit means used with the power supply circuit shown in FIG. 2 is comprised by a gating signal generator including a programmable unijunction transistor $Q_3$ having its cathode connected through a load resistor $R_{11}$ to the power supply terminal 16. The load resistor $R_{11}$ is coupled through a coupling capacitor $C_6$ to the gating electrode of a pilot switching SCR $Q_2$ that has its anode connected through a resistor $R_{13}$ to the anode of the main, power rated SCR $Q_1$, and has its cathode connected through a load resistor $R_{12}$ to the power supply terminal 16. The load resistor $R_{12}$ in turn is connected to the gating electrode of the main power rated SCR thyristor $Q_1$. With this arrangement, upon the programmable unijunction transistor $Q_3$ (hereinafter referred to as PUT) being rendered conductive, a gating-on pulse will be produced across load resistor $R_{11}$ which is coupled through coupling capacitor $C_6$ to gate-on pilot SCR $Q_2$. $Q_2$ in turn, then produces a strong gating-on pulse across its load resistor $R_{12}$ which is of sufficient magnitude to assure safe turn-on of the main power rated SCR thyristor $Q_1$.

The PUT $Q_3$ is a conventional, commercially available 3-terminal PNPN device manufactured and sold by the General Electric Company and several other Companies. The three terminals of PUT $Q_3$ are comprised by a cathode which is connected to a load resistor $R_{11}$ and an anode which is connected to a pair of biasing resistors $R_7$ and $R_{22}$ and an anodegate which is connected to the junction of a second pair of biasing resistors $R_9$ and $R_{10}$ is connected in common to the collector of a PNP switching transistor $Q_4$ and an NPN switching transistor $Q_5$ which comprise a first control switch means that controls the time of turn-on of the PUT $Q_3$. Transistors $Q_4$ and $Q_5$ are interconnected through a pair of series connected resistors $R_5$ and $R_6$ which have their junction connected to the base of transistor $Q_4$. Energizing potential is supplied to transistors $Q_4$ and $Q_5$ from a source of low voltage, direct current comprised by a diode $D_1$ which is connected in series circuit relationship with a dropping resistor $R_{15}$ and discharging resistor $R_8$ across the high voltage power supply terminals 15 and 16, and a filter capacitor $C_8$ and zener diode $Z_1$ connected across $R_8$ for stabilizing the value of the low voltage DC supply potential built up across the capacitor $C_8$. This low voltage direct current supply potential of the order of 20 volts is applied across low voltage direct current supply terminal 19 to the emitter of switching transistor $Q_4$ and through resistors $R_6$ and $R_5$ to the collector of transistor $Q_5$. Upon switching transistor $Q_5$ being turned-on in the manner to be described hereinafter, it will reduce the base voltage of PNP transistor $Q_4$ sufficiently to turn-on $Q_4$, and apply energizing potential through the biasing resistors $R_7$, $R_{22}$, $R_9$, and $R_{10}$ to PUT $Q_3$. The anode of PUT $Q_3$ also is connected to a timing capacitor $C_5$ which is charged through resistors $R_7$ and $R_{21}$ at an exponential rate, and upon attaining a preset firing potential relative to the bias developed across the anode-gate biasing resistors $R_9$, $R_{10}$, $Q_3$ will turn-on and supply a gating-on pulse to the pilot switching SCR $Q_2$; provided, however, that the charge on timing capacitor $C_5$ has been allowed to build up to sufficient magnitude as will be explained hereinafter.

The gating circuit means for the power supply of FIG. 2 is further comprised by means in the form of a limiting resistor $R_3$ connected across one of the reactive commutating components, namely, $L_3$ in FIG. 2, for deriving a first, high frequency, alternating current, gate controlling signal voltage from voltage $V_3$ across inductor $L_3$ and supplying the same across a conductor 25 to common A.C. coupling capacitor $C_4$ to the base of the $Q_5$ switching transistor. Means in the form of a resistor $R_1$ is connected to the high voltage power supply terminal 15 for deriving a second, alternating current, gate controlling signal voltage at the frequency of the high voltage potential $V_s$ appearing across the high voltage power supply terminal 15 which includes the low frequency, full wave rectified, undulating excitation potential component. This second, alternating current, gate controlling signal voltage could be obtained through a coupling capacitor shown in phantom in place of or in conjunction with $R_1$, should it be desired to do so since only the alternating current component of the voltage $V_s$ appearing across supply terminals 15 and 16 is used. Further, the second alternating current gate controlling signal voltage component supplied through resistor $R_1$ and conductor 25 is predominately effective upon initial turn-on of the chopper-inverter circuit at the beginning of such half-cycle or following some interval of non-operation as will be appreciated more fully hereinafter.

The first and second alternating current gate controlling signal voltage component supplied through resistors $R_3$ and $R_1$, respectively, and across conductor 25 are summed across resistors $R_{21}$ and $R_2$ and coupled to a common alternating current coupling means comprised by a capacitor $C_4$ to the base of the NPN switching transistor $Q_5$. The resistors $R_{21}$ and $R_2$ and capacitor $C_4$ are proportioned to comprise a differentiating circuit so that the voltage $V_5$ appearing at the base of transistor $Q_5$ is in effect the differentiated value of the voltage $V_4$, namely, $(dV_4/dt)$. To limit this voltage $V_5$ to some safe value during its negative excursion, a clamping diode $D_2$ is connected between the base of $Q_5$ and the supply terminal 16 with the cathode of $D_2$ being connected to the base of $Q_5$.

In addition to the first and second alternating current, gate controlling signal components supplied through coupling capacitor $C_4$, the base of switching transistor $Q_5$ has supplied to it a direct current bias potential through a direct current biasing network comprised by a resistor $R_4$ and resistors $R_{18}$ and $R_{17}$ interconnected between the base of transistor $Q_5$ and the low voltage direct current supply terminal 19. The juncture of the resistors $R_{18}$ and $R_4$ is connected to the collector electrode of a second control switch means comprised by a NPN switching transistor $Q_8$ whose emitter is connected to the supply terminal 16. Upon turn-on of $Q_8$, it serves effectively to connect the base of switching transistor $Q_5$ through resistor $R_4$ to the voltage of supply terminal 16. Thus, the value of the direct current bias potential applied to the base of switching transistor $Q_5$, in effect, is controlled by the on or off condition of transistor $Q_8$. With $Q_8$ on and conducting, $Q_5$ base is maintained at substantially the DC potential of supply terminal 16 so that the alternating current gating signal voltages supplied through resistors $R_3$ and $R_1$ and conductor 25 and common coupling capacitor $C_4$ have a controlling effect. With $Q_8$ turned-off and non-conducting, the positive direct current bias potential applied through resistors $R_{17}$, $R_{18}$, and $R_4$ to the base of $Q_5$, maintains $Q_5$ turned-on and conducting, and the alternating current gating signal voltages supplied through $R_1$ or $R_3$, conductor 25 and common coupling capacitor $C_4$ have no effect on the operation of $Q_5$.

In order to prevent actuation by the r-f components of voltage fed by conductor 25 via capacitor $C_4$ to the base of $Q_5$ of the switching action of $Q_8$ on the value of the direct current bias potential applied to the base of switching transistor $Q_5$, a capacitor $C_{11}$ is connected across resistor $R_{17}$ and $R_{18}$ between the collector of $Q_8$ and the low voltage DC supply terminal 19. The purpose of the delay capacitor $C_{11}$ will be described more fully hereinafter following a description of the overall operation of the circuit.

The switching-on and off action of second control transistor switch $Q_8$ is in turn, controlled by the on or off condition of a second PNP switching transistor $Q_9$. $Q_9$ has its base electrode connected to the junction of the biasing resistors $R_{17}$ and $R_{18}$. The emitter of transistor $Q_9$ is connected to the low voltage direct current supply terminal 19 and its collector is connected through a zener diode $Z_2$, and series connected voltage dividing resistors $R_{20}$, a converter power controlling device shown generally at PC and resistor $R_{19}$ to the high voltage power supply terminal 16. The power controlling PC is illustrated functionally in FIG. 2 to depict where such control would be located in order to allow an operator of the power supply directly to control the on or the off condition of $Q_8$ externally and independently of the conducting condition of transistor $Q_9$. From a consideration of the $Q_8$ and $Q_9$ interconnection, it will be appreciated that the two transistors form a second latching transistor control switch, since with $Q_9$ turned-on, $Q_8$ will be turned-on and both transistors will latch in the on condition assuming that the power control PC is in a condition which enables turning-on of the latching transistor switch thus comprised. A suitable form of power control PC for controlling the condition of the second latching transistor control switch $Q_8$, $Q_9$ will be described more fully hereinafter in connection with FIG. 5 of the drawings. However, for the purpose of the following discussion, it will be assumed that the power control is in an enabling condition, and hence will be treated as though there were a short circuit connection between resistors $R_{20}$ and $R_{19}$.

Figure 3A:
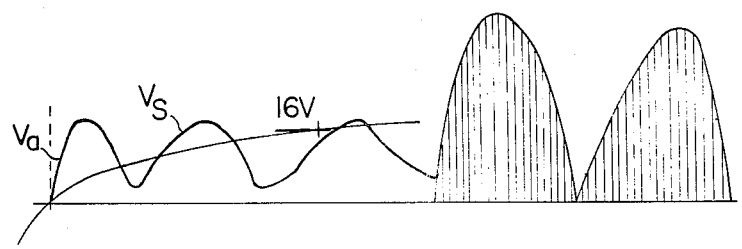
FIGS. 3(a), 3(b) and 3(c) comprise a set of voltage wave forms plotted on a 120 hertz time scale, and illustrate the manner of operation of the improved AC to RV chopper-inverter circuit over a number of half cycles of the supply full wave rectified alternating current potential following initial turn-on of the circuit.

During operation of the power supply shown in FIG. 2, there are really two different phenomenon whereby the first control switch means is turned on and off by switching transistor $Q_5$ to thereby control turn-on and off of PUT $Q_3$ with resulting gating-on of pilot SCR $Q_2$ and the main power SCR $Q_1$ when $Q_5$ is turned-off in the previously described manner. The controlling phenomenon to be described occurs upon initially placing the dc power supply in operation and/or upon enabling the dc power supply after any prolonged period of inoperation beyond one cycle of high frequency operation of the chopper-inverter. Upon initially placing the circuit in operation by closure of switch $S_1$, a full wave rectified potential at the voltage of the alternating current supply line will be produced across the high voltage, power supply terminals 15 and 16 as shown in FIG. 3A of the drawings. Because of charge build-up on the capacitors $C_1$ and $C_3$ as well as filter capacitor $C_8$ in the low voltage DC supply, the voltage on supply terminals 15 and 16 will not go precisely to zero intermediate each half cycle of the full wave rectified output from bridge $CR_1$ but approaches a limiting value of 10 to 12 volts. The point at which $S_1$ is closed can be any arbitrary point in a half cycle of the supply potential appearing across terminals 15 and 16 and for convenience is shown as $V_a$ where such switch $S_1$ is closed. At this point, charge will start building-up on the filter capacitor $C_8$ in the low voltage DC supply toward the 20 volt regulating value of zener diode $Z_1$.

As soon as any positive voltage appears on the 20 volt DC power supply terminal 19, it will cause $Q_5$ to turn-on thereby turning-on $Q_4$ and to apply whatever potential is on 19 through the biasing resistor network $R_7$, $R_{22}$, $R_9$, $R_{10}$ to the anode and anodegate, respectively, of PUT $Q_3$. This allows $C_5$ to be charged up in accordance with the RC time constant to whatever value of potential is available and to fire $Q_3$. However, because of the low value of the voltage on $C_5$ when $Q_3$ fires under these circumstances, the output signal pulse appearing across $R_{11}$ in the cathode of PUT $Q_3$ is not sufficiently strong to gate-on the pilot switching SCR $Q_2$. Hence, PUT $Q_3$ will be latched-on and will prevent $C_5$ from charging further. As is shown in FIG. 3A, the charging up of the voltage on filter capacitor $C_8$ will then continue charging toward its full 20 volt regulating value of $Z_1$ over several cycles of the half wave rectified potential $V_s$. Upon reaching the regulating value of zener diode $Z_2$, the circuit will be conditioned to allow operation of the chopper-inverter. This is due to the fact that at this point, there will be adequate energy to insure safe firing of the $Q_2$ pilot switching SCR. However, for the number of half cycles required to reach the regulating level of zener diode $Z_2$, an inherent delay is imposed on the production of the first gating-on pulse of adequate energy to the $Q_2$ pilot switching SCR and hence the main power thyristor $Q_1$ of the chopper-inverter. This will then assure adequate charging time for the commutating component $C_1$ and $C_3$ to allow these components to be charged to the value of $V_s$. If this delay were not provided, and the power thyristor $Q_1$ turned-on with an inadequate amount of commutating energy stored in the commutating capacitors $C_1$-$C_3$, there would be a strong possibility that the circuit would fail to commutate after initial turn-on of the $Q_1$ power thyristor thereby causing the circuit to fail in operation. By the inclusion of the zener diode $Z_2$, which is selected to have a relatively sharp knee in its voltage versus current characteristic curve, the above-described delay is imposed, and safe commutation will be assured in advance of supplying the first gating-on pulse of adequate energy to the power thyristor $Q_1$.

Figure 3B:
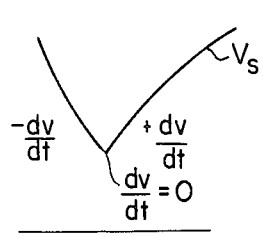

During the interval while the low voltage DC supply terminal 19 is building-up to the 16 volt enabling potential of zener diode $Z_2$, the first switching transistor $Q_5$ will be switched off and then on at each zero point of the full wave rectified potential $V_s$. This is depicted in FIG. 3(b) of the drawings wherein it will be seen that during the 90° to 180° portion of each half cycle of $V_s$, the slope of $V_s$ will be negative. Hence, the $V_4$ potential fed back through $R_1$ and conductor 25 will decrease and its differential ($dV_4/dt$) will be negative. As stated earlier, capacitor $C_4$ and resistors $R_{21}$ and $R_2$ are proportioned to operate as a differentiating circuit so that the value $V_5$ at the base of switching transistor $Q_5$ will be determined by the combined values of the positive direct current bias supplied over resistors $R_{17}$, $R_{18}$ and $R_4$ and the value ($dV_4/dt$). Just prior to reaching the zero point of $V_s$, the value of ($dV_4/dt$) reaches a negative maximum because the rate of change of $V_4$ is a maximum and causes $V_5$ to go negative towards the value of the potential of supply terminal 16. This, in turn, drives the base of second control switching transistor $Q_9$ negatively and causes $Q_9$ which is a PNP transistor to turn-on temporarily. If the value of the potential on supply bus 19 due to the build-up of charge on $C_8$ is less than the regulating volue of zener diode $Z_2$, the second control switch will not be caused to latch on and $Q_5$, $Q_4$ and $Q_3$ remain latched on in their conducting condition. However, when the value of the low voltage DC supply potential does attain or exceed the 16 volt regulating value of $Z_2$, thereafter, upon the occurrence of the next succeeding zero point in supply potential $V_s$, $Q_9$ will again be turned-on by the above-described process and $Z_2$ will break down and conduct. It is assumed that the power controlling PC is a short circuit for the purpose of this description so that a positive polarity turn-on potential may be applied to the base of $Q_8$. Feedback through $R_{20}$ from the collector of $Q_8$ causes latching on of $Q_9$ and $Q_8$.

It will be recalled that during the above-described process, $Q_5$ has been conducting all of the time. Upon $Q_8$ being turned-on, it will connect the juncture of $R_4$ and $R_{18}$ to the potential of the supply terminal 16 thereby eliminating the positive polarity direct current bias potential at the base of $Q_5$ and allows $Q_5$ to turn-off. This action may occur substantially anywhere in time between the peak and the next minimum of the potential $V_s$ wherein $(dV_4/dt)$ is negative. Upon $Q_5$ turning-off, $Q_4$ turns-off and PUT $Q_3$ is allowed to return to its blocking non-conducting condition.

Following the action described in the preceding paragraph, the full wave rectified supply potential $V_s$ will pass through its zero point and its slope will go positive. As a consequence the $V_4$ voltage fed back by resistor $R_1$ and conductor 25 will go positive and the differential of this voltage $(dV_4/dt)$ becomes positive. Upon this occurrence, with $Q_8$ latched-on and the direct current bias on the base of $Q_5$ at substantially zero valve, the positive polarity A.C. feedback signal $(+dV_4/dt)$ will again turn-on $Q_5$. Consequently $Q_4$ turns-on to supply energizing potential to the biasing resistor network of PUT $Q_3$ and to timing capacitor $C_5$. At this point, it will be recalled that the value of the supply potential from the low voltage DC supply bus 19 has now built-up to substantially its full 20 volt value. Accordingly, within the RC charging time $t_2$ of capacitor $C_5$ an adequate charge will be built-up on $C_5$ so that when $Q_3$ is fired at the end of $t_2$ due to attaining appropriate proportional values for its anode and anode-gate potentials, the full charge on $C_5$ will be dumped by $Q_3$ through load resistor $R_{11}$. This produces a strong firing pulse to cause turn-on of the pilot switching SCR $Q_2$, that, in turn, causes the main power thyristor $Q_1$ to be gated-on and the converter to generate high frequency power for the remainder of the half cycle of the power line frequency. With the second control switch latched, the inverter will start for all subsequent half cycles since the transistor $Q_8$ is on and there is no positive dc bias applied to the base of $Q_5$.

Upon turn-on of power thyristor $Q_1$, the charge on the commutating capacitor $C_1$ and $C_3$ will be oscillated through inductor $L_1$ and inductor $L_3$ in a resonant manner to cause initially a reversal of the charge on capacitors $C_1$ and $c_3$ and thereafter by reverse conduction through the fast recovery diode bridge $CR_1$, return the charge on the capacitors back to their initial state having the polarity indicated in FIG. 2. FIG. 4(b) of the drawings illustrates the wave shape of the current through the SCR and diode bridge, respectively. The SCR current $I_{SCR}$ is the positive polarity half of the $t_1$ sinusoid and the reverse diode current flowing through the fast recovery diode bridge $CR_1$ is shown as the negative portion of the sinusoid occuring during period $t_1$. Any power consumption occurring during each oscillation due to loading of the induction heating coil $L_3$, for example, will be drawn from the alternating current supply and will cause increase in the dc component value of the current $I_2$ shown in FIG. 4(c) of the drawings. The resulting current flowing through inductor $L_1$ is $I_{L_1}$ where the SCR and diode currents are imposed on the $I_2$ current drawn from the A.C. supply lines through filter inductors $L_2$ and $L_2'$.

After initial turn-on of the main power thyristor $Q_1$ in the above described manner, the voltage across the supply terminals 15 and 16 will essentially collapse to zero during the $t_1$ conduction and commutating period as shown in FIG. 4(d) of the drawings. Thereafter, control over the switching action (conducting condition) of switching transistor $Q_5$ will be taken over by the component of the voltage appearing across induction heating coil $L_3$ and fed back through resistor $R_3$ and conductor 25 through common coupling capacitor $C_4$ to the base of switching transistor $Q_5$. FIG. 4(d) of the drawings illustrates tfhe relative phase of the voltage $V_3$ appearing across induction heating coil $L_3$, and FIG. 4(e) illustrates the resultant value of the voltage $V_4$ fed back to the differentiating circuit comprised by capacitor $C_4$ and resistors $R_{21}$ and $R_2$. From a consideration of FIGS. 4(d) and 4(e), it will be appreciated that immediately upon turn-on of the power thyristor $Q_1$, the $V_4$ voltage drops sharply in the negative direction as does the differentiated value $(-dV_4/dt)$ so as to cause turn-off of $Q_5$ and $Q_4$ together with PUT $Q_3$ (due to the complete discharge of capacitor $C_5$) substantially concurrently with the turn-on of main power SCR $Q_1$. Thereafter, the chopper-inverter oscillates through one commutating period $t_1$ whereupon both the thyristor and the feedback diode rectifier bridge become blocking and the potential $V_4$ goes sharply positive due to the sharp increase in potential across power supply terminals 15 and 16 at the point where one resonant oscillation has been completed, and feedback through the diode rectifier bridge $CR_1$ ceases. This sharp increase in voltage in the positive direction is fed back through resistor $R_1$ and conductor 25 and results in a sharp increase in the value $(+dV_4/dt)$ in the positive direction, causing first switching transistors $Q_5$ and $Q_4$ to turn-on, and to commence charging of the timing capacitor $C_5$. This is illustrated in FIG. 4(f) of the drawings wherein it will be seen at the end of the commutating period $t_1$, $Q_5$ turns-on and starts the $t_2'$ timing period at the rate set by the RC time constant of timing capacitor $C_5$ and the charging resistors $R_7$ and $R_{21}$. However, at this point in the operation the $t_2$ time is not allowed to run out its full $t_2'$ time which is set for no-load operating conditions, but will be stopped at some intermediate $t_2$ point by turn-on of PUT $Q_3$ in a different manner as described hereinafter.

From a consideration of the $V_4$ voltage characteristic curve shown in FIG. 4(e), it will be seen that upon turn-on of $Q_1$, the $V_4$ voltage drops sharply negative and then tends to follow a sinusoid as the $V_3$ voltage (voltage across induction heating coil $L_3$) swings negative and then back toward zero in a positive direction in the normal manner of a half sinusoid. As the $V_3$ voltage swings toward zero, the $t_1$ commutating interval terminates and the potential across terminals 15 and 16 will increase sharply in the positive direction as shown in FIG. 4(d). This, in turn, results in a sharp increase in the $V_4$ feedback voltage which then further increases above the initial value due to the positive half sinusoid of the $V_3$ voltage. After the $V_3$ voltage passes through its positive peak and starts back down in the negative going direction, but prior to reaching zero, the value of the $V_4$ feedback voltage flattens off and its differentiated value $(dV_4/dt)$ goes to zero.

Upon the gate controlling feedback signal $(dV_4/dt)$ going to zero, base current $I_5$ supplied to $Q_5$ by the differentiating capacitor $C_4$ likewise will go to zero, and $Q_5$ will be allowed to turn-off. Turn-off of $Q_5$ at this point then results in turn-off of $Q_4$ and removes the biasing potential from the biasing resistors $R_7$, $R_{21}$ and $R_9$, $R_{10}$. This, in turn, results in leaving only the positive potential built-up across the $C_5$ timing capacitor applied to the anode only of PUT $Q_3$ with no counterbalancing anode-gate bias potential. As a consequence, PUT $Q_3$ turns-on and dumps the charge on $C_5$ timing capacitor through its load resistor $R_{11}$. This, in turn, turns-on the pilot switching SCR $Q_2$ and again turns-on the power thyristor $Q_1$ to initiate a new cycle of oscillation of the chopper-inverter. The process described above will then be repeated thereafter through the succeeding high frequency operating cycles of the chopper-inverter.

From the foregoing description, it will be appreciated that the setting of the RC time constant of timing capacitor $C_5$ does not by itself determine the operating period of the chopper-inverter. What, in fact, determines the operating period is the point in an operating cycle when the $V_4$ voltage fed back through differentiating capacitor $C_4$ to the base of the switching transistor $Q_5$ flattens out, and its $(dV_4/dt)$ value goes to zero, thus allowing $Q_5$ base current to go to zero. This point is, of course, determined by the phase of the $V_3$ voltage appearing across induction heating coil $L_3$.

It has been determined that loading of the $L_3$ induction heating coil with a metal base cookware heating load will, in fact, change the tuning, and hence, the operating period of the chopper-inverter circuit. However, by reason of the above-described $V_4$ voltage feedback phenomenon, the circuit will exhibit a "frequency pushing" characteristic which will actually increase the repetition rate of the firing pulses supplied to the power rated thyristor $Q_1$ so as automatically to increase the operating frequency to thereby track changes in resonant frequency of the LC commutating components due to loading. This frequency pushing characteristic is extremely valuable and inherent in the novel nature of applicant's improved gating circuit design and in effect constitutes a pan safety control means since it allows the chopper inverter circuit to be used safely with pans of all types without being seriously damaged.

The clamping diode $D_2$ is connected between the base of first switching transistor $Q_5$ and supply terminal 16 with the polarity indicated wherein the cathode of the diode is connected to the base of $Q_5$ and its anode is connected to supply terminal 16. This diode limits the $(-dV_4/dt)$ value of the gate controlling feedback voltage in the negative direction to one diode drop. In the positive direction, the base to emitter junction of $Q_5$ acts to limit the gate controlling feedback voltage. In this way the input to transistor $Q_5$ is clipped in both directions of current flow through $C_4$. Additionally the values of $C_4$, $R_1$ (and of a coupling capacitor which may be placed in series with it) and $R_3$ together with $R_{21}$ and $R_2$ are appropriately scaled to assure safe values of feedback voltage at the base of $Q_5$, low dissipation of power in the resistors, and also to assure that the values of these components provide stable operation of the circuit particularly at start-up before high frequency voltages are generated between terminals 15 and 16.

At the point where a housewife or other operator of the induction cooking unit desires to stop operation of the circuit, the power control element PC heretofore assumed to be in a condition which allows transistor $Q_8$ to stay latched-on in its conduction condition, causes $Q_8$ to turn-off. Upon turn-off of $Q_8$, it will be seen that the positive direct current bias potential applied through resistor $R_{29}$, $R_{18}$ and $R_4$ again will be effective to cause turn-on of $Q_5$ and prevent further generation of high frequency oscillations in the above-described manner. However, the shut down action does not occur at the moment $Q_8$ turns-off and positive bias is again applied to the base of $Q_5$ through $R_4$. In the oscillating condition the voltage fed back from $L_3$ is present whereas prior to oscillation, is is not. Also both $V_s$ and $V_3$ are much larger than they are prior to oscillation. As a result, the positive bias current through $R_4$ is not sufficient to keep $Q_5$ on in the presence of $V_s$ and $V_3$ in the oscillating condition. Only when the supply voltage falls to nearly zero will oscillations cease. Thereafter, the positive bias current through $R_4$ will inhibit start up on the next half cycle. Thus, the inverter is shut down essentially at zero supply voltage by this behavior and independently of when the $Q_8$, $Q_9$ second control switch is turned-off in a given half-cycle of line voltage. Capacitor $C_{11}$ is employed primarily to prevent premature turn-on of secure control switch transistor $Q_8$ at the instant the power is applied to the unit. Capacitor $C_{11}$ also slows the rate at which the current through $R_4$ is reapplied to the base of $Q_5$ to prevent a momentary loss of control of $Q_5$ by the rf component of $V_s$ and of $V_3$, and has been found helpful but not essential in this respect. It will be appreciated therefore that by reason of the zero point turn-on (described with relation to FIG. 3(b)) and the zero point turn-off achieved through the predominating influence of the relatively high levels of $V_s$ and $V_3$ under oscillation over the influence of the shut off current through $R_4$, soft starting and stopping of the A.C. to R.F. chopper-inverter is achieved. Electro-magnetic interference effects are thereby minimized that otherwise might occur due to the lack of large, stiff, direct current filtering components normally employed in chopper-inverter power supply circuits of this same general nature. Further, the zero point soft starting and stopping further prevents the generation of highly objectionable acoustical noises and clicks in a load utensil which is being heated inductively by the unit. Radio frequency interference emissions that otherwise might be produced by high transient currents and voltages arising from randomly phased turn-on and turn-off times are also prevented. Finally, expensive and critical semiconductors as well as coils and capacitors are safeguarded from transient over voltages and over currents in the start up and shut down processes.

Figure 5:
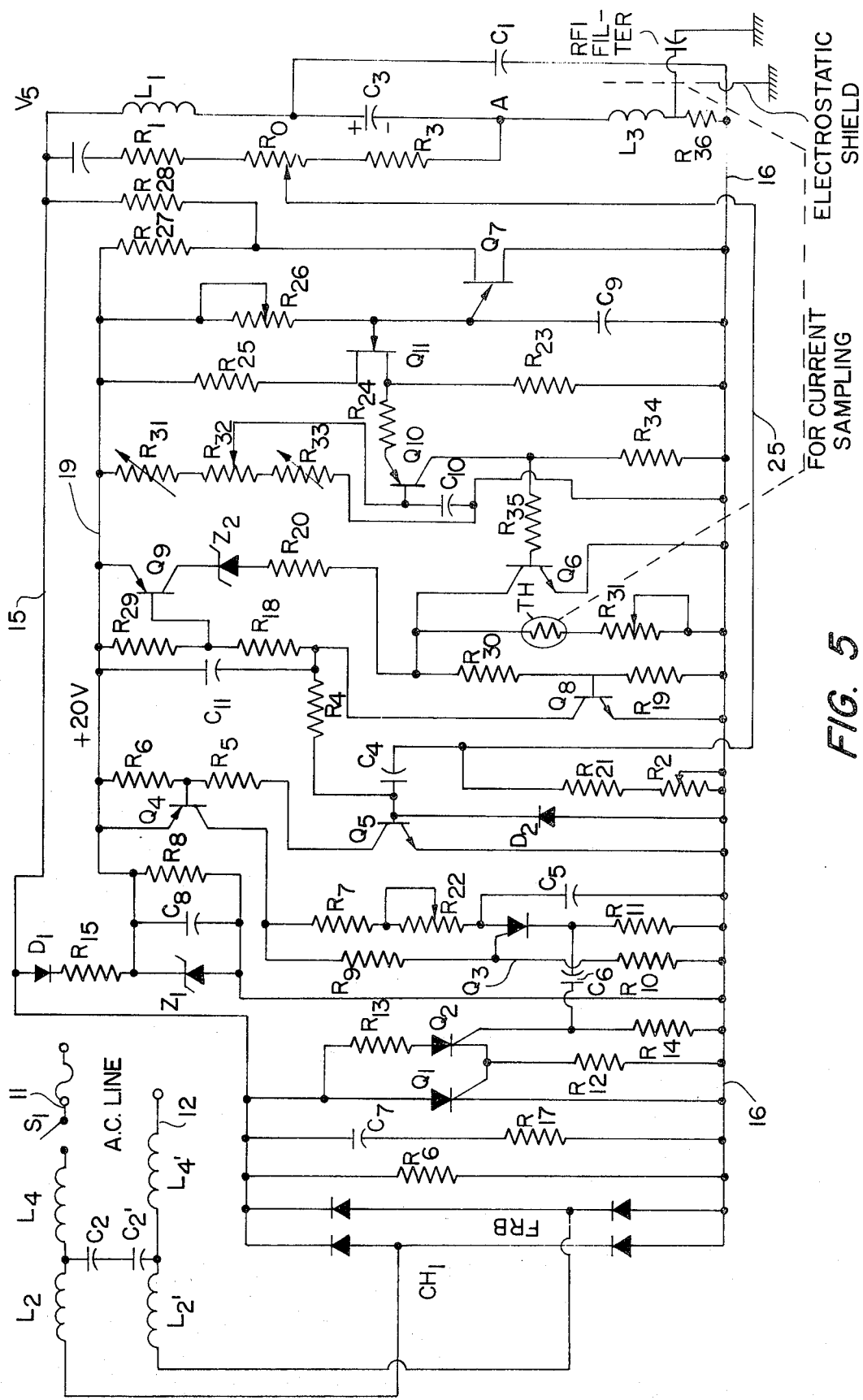
FIG. 5 is a detailed schematic circuit diagram of the improved AC to RF induction heating unit power supply according to the invention showing additional control circuit features incorporated into a preferred embodiment of the invention.

FIG. 5 of the drawings illustrates the details of construction of a preferred form of electronic power control P.C. for use with the new and improved induction cooking unit power supply. As shown in FIG. 5, the preferred electronic power control comprises an inhibit transistor $Q_6$ having its emitter connected to power supply terminal 16 and its collector connected to the juncture of resistor $R_{20}$ and the base of second control switching transistor $Q_8$ through a resistor $R_{30}$. With this arrangement, it will be appreciated that upon $Q_6$ being rendered conductive, it will clamp the base of second control switching transistor $Q_8$ to the potential of power supply terminal 16 thereby preventing $Q_8$ from turning-on or if $Q_8$ is on, turning it off. By appropriately controlling the conduction of inhibit transistor $Q_6$, second control switching transistor $Q_8$ willl be either enabled or inhibited and thereby will control action of first switching transistor $Q_5$ in the previously described manner.

In order to control the on-off condition of inhibit transistor $Q_6$, a duty cycle control is provided which includes a unijunction transistor relaxation oscillator comprised by a unijunction transistor $Q_7$ having one of its base electrodes connected directly to high voltage power supply terminal 16 and the remaining base electrode connected through a dropping resistor $R_{27}$ to the 20 volt low voltage direct current power supply 19. To assure synchronization of the operation of the unijunction transistor relaxation oscillator, a limiting resistor $R_{28}$ may be connected between the high voltage power supply terminal 15 and the last mentioned base of unijunction transistor $Q_7$. The unijunction transistor relaxation oscillator is further comprised by an RC network including variable resistor 26 and capacitor $C_9$ which are connected in series circuit relationship between the 20 volt power supply terminal 19 and the high voltage power supply terminal 16 with the juncture of resistor 26 and capacitor $C_9$ being connected to the emitter of unijunction transistor $Q_7$ in a conventional manner.

The output from the unijunction transistor oscillator $Q_7$ is supplied to the base electrode of a field effect transistor follower amplifier $Q_{11}$ having its drain connected through a resistor $R_{25}$ to the 20 volt DC power supply terminal 19 and having its source connected to a resistor $R_{23}$ to the power supply terminal 16. The source of field effect transistor $Q_{11}$ also is connected through a limiting resistor $R_{24}$ to the emitter of a PNP transistor $Q_{10}$ having its collector connected through a load resistor $R_{34}$ to the high voltage power supply terminal 16. Load resistor $R_{34}$ also is connected through a limiting resistor $R_{35}$ to the base of the inhibit transistor $Q_6$. PNP transistor $Q_{10}$ has its base electrode connected to the movable contact of a variable resistor $R_{32}$ which is connected in series circuit relationship with two other resistors $R_{31}$ and $R_{33}$ (which may be adjustable) and the series circuit thus comprised is connected between the low voltage direct current power supply terminal 19 and high voltage power supply terminal 16. A radio frequency by-pass capacitor $C_{10}$ is connected between the base of PNP transistor $Q_{10}$ and the high voltage power supply terminal 16.

With the duty cycle control circuit comprised as described in the preceding paragraphs, the unijunction transistor $Q_7$ will operate in the normal manner of a relaxation oscillator to generate a ramp timing voltage which will have a sawtooth wave shape similar to that shown in FIG. 4(f) of the drawings, but which will extend over a considerably larger period of as many as 120 half cycles of the supply voltage. This timing ramp signal will be synchronized with the $V_s$ full wave rectified potential due to the feedback across resistor $R_{28}$ and, in turn, will be supplied to the base of tfhe field effect transistor follower amplifier $Q_{11}$ (hereinafter referred to as FET follower amplifier $Q_{11}$). FET follower amplifier $Q_{11}$ supplies emitter current to the PNP amplifier $Q_{10}$ and also provides high impedance isolation between the unijunction transistor oscillator $Q_7$ and PNP amplifier $Q_{10}$. By appropriate adjustment of the variable resistor $R_{32}$, the point in the sawtooth waveform timing voltage generated by UJT relaxation oscillator $Q_7$ at which $Q_{10}$ is rendered conductive, can be variably controlled by an operator of the power supply from 0 to 100 percent conductivity over the period of the sawtooth ramp voltage. Upon $Q_{10}$ being rendered conductive at the set-point selected by the operator, the base of NPN inhibit transistor $Q_6$ will be driven positive, thereby clamping off the base voltage to the second control switching transistor $Q_8$ in the previously described manner. Thus, if resistor $R_{32}$ is adjusted to cause $Q_{10}$ to turn-on at a point just after each sawtooth ramp begins, inhibit transistor $Q_6$ will be turned-on and thereby inhibit turn-on of the second control switching transistor $Q_8$, and hence, inhibit high frequency operation of the chopper-inverter high frequency power supply after only a few half cycles of the power line frequency and for the remainder of the ramp time. However, if variable resistor $R_{32}$ is set to cause turn-on of $Q_{10}$ at a point much later in the ramp, the high frequency chopper-inverter will be enabled and allowed to operate over a larger number of the half cycles which can occur during the ramp time, thereby providing power to the load over a proportionately greater operating interval. By thus controlling the point of turn-on of $Q_{10}$, the duty cycle of the chopper-inverter can be controlled from 0 to 100 percent of its rated output power in many small discrete steps each having a duration of one half cycle of the line frequency. By employing many steps and a ramp time of about one-half to 1 second, the control of load power appears to a load at $L_3$ such as a metal based cooking utensil to be essentially infinite in nature.

An additional, important safety feature of the circuit shown in FIG. 5, is provided by a thermistor TH which is connected in series circuit relationship with an adjustable resistor $R_{31}$ across resistors $R_{30}$ and $R_{19}$. Thermistor TH may be physically attached and thermally coupled to a small sensing resistor $R_{36}$ which is connected in series circuit relationship with the induction heating coil $L_3$ between $L_3$ and the high voltage power supply terminal 16. With this arrangement, when the load current through induction heating coil $L_3$ becomes excessive, sensing resistor $R_{36}$ will be heated and will cause thermistor TH (which has a negative temperature coefficient) to reduce its resistance value sufficiently to cause the base of first switching transistor $Q_8$ to be reduced toward the potential of power supply terminal 16 sufficiently to turn-off $Q_8$. This will maintain the second switching transistor $Q_8$ in its off (current blocking) condition, allowing $Q_5$ to latch-on and prevent further high frequency oscillations until such time that the sampling resistor $R_{36}$ cools and allows thermistor TH to return to its normal high resistivity condition.

It will be appreciated that the thermistor TH indirectly by attachment to $R_{36}$ to sense current or simply by physical proximity will sense the operating temperature condition of the induction heating load coil, and whenever the coil current or temperature are excessive for the power rating of the thyristor $Q_1$, etc., will cause the circuit to shut-down, until the temperature sensing resistor $R_{36}$ or the load coil or both are allowed to cool to an ambient temperature condition.

Also it has been determined, that where a high conductivity pan fabricated from aluminum, copper or other highly conductive metal is used with an induction cooking unit of the type herein described, it will cause excessive load current to flow in the induction heating coil even though the current through $Q_1$ is decreased by the use of such a highly conductive load. Whenever a housewife or other operator of the unit employs the wrong type of highly conductive pan with the induction cooking unit, thermistor TH attached to sampling resistor will protect the load coil from being permanently damaged by self-heating due to use with such a highly conductive pan. The housewife or other operator will be advised by the turning-on and turning-off of the circuit by thermistor TH that the pan is not a proper cooking vessel to use with the induction cooking unit, and hopefully, will be thereby instructed to shift to a stainless steel, or other lossy ferromagnetic type of pan that provides a satisfactory load for the induction heating coil $L_3$. If desired, a latching type of temperature sensitive safety circuit such as the one described in copending U.S. patent application Ser. No. 131,648, now U.S. Pat. No. 3,710,062, could be employed with thermistor TH to turn-off $Q_8$ and the circuit latched into an inoperative condition indefinitely, until the 20 volt power supply is turned-off or the safety circuit is reset mannually or otherwise. Also, with such an arrangement it could be made necessary for the operator to turn-off the main on-off switch $S_1$ to discontinue the latching condition of the temperature sensitive safety circuit thereby driving home the lesson, that the highly conductive pan should not be used. In any case the thermistor must be allowed to cool before high frequency oscillations can begin again even after supply power has been removed and reapplied. This feature coupled with the feedback control of the gating circuit to accommodate pan loading of all types, protects the induction cooking unit power supply from serious damage under circumstances where an improper pan load is used by the housewife.

In addition to over current and over temperature control it is possible to cause the second zero point control switch to shut down the inverter when $V_s$ attains an over voltage condition due to excess line voltage for example, a second thermistor in shunt with the first and heated by a resistor connected across $V_s$ could be used to shut down the inverter acting in conjunction with the first thermistor which senses an over current or over temperature condition, for example. Any number of methods are available for providing all type of on-off control as may be required for protecting and programming the inverter.

Figure 6:
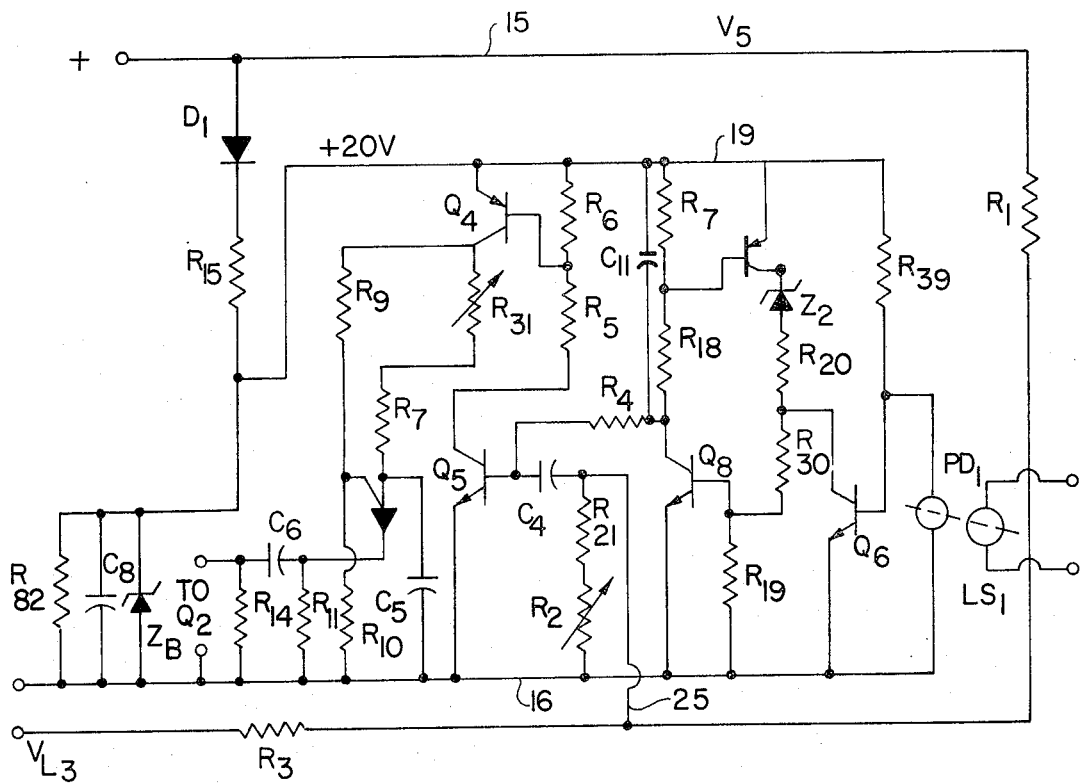
FIG. 6 is a detailed schematic circuit diagram of the gating circuit portion only of a form of the invention which provides light coupling, magnetic coupling or some other form of electrical isolation between the operator control knob and the electronic portions of the circuit.

FIG. 6 is a detailed circuit diagram of an embodiment of the new and improved induction cooking unit power supply wherein electrical isolation is provided between the duty cycle control and the gating circuit portions of the power supply. In FIG. 6, for convenience, the power components of the circuit have not been illustrated since they are not required for a clear understanding of the modification proposed. In FIG. 6, a photo diode, photocell, photo-sensitive resistor, or other light sensitive element shown at $PD_1$ is connected across the base emitter of the inhibit transistor $Q_6$ with the base being connected through a limiting resistor $R_{39}$ to the low voltage direct current power supply terminal 19. The photo diode $PD_1$ is light coupled through a light path indicated by the dotted line to a light source $LS_1$. The light path may comprise a fiber optic coupling element to light source $LS_1$ which, in turn, may be excited from the output of the duty cycle control PNP output amplifier $Q_{10}$ in a similar manner to that described in connection with FIG. 5. By turning the light source $LS_1$ on and off with the duty cycle control in accordance with a desired power setting, light coupling to the photo-sensitive element $PD_1$ will cause inhibiting transistor $Q_6$ to turn-on and off in accordance with the duty cycle control power setting, and the circuit will operate in the previously described manner to supply high frequency excitation current to the induction heating coil. By reason of the light coupling path, electrical isolation is provided between the gating circuits and the operator controlled portion of the duty cycle control. In place of light path coupling, a magnetically operated reed switch could be inserted in place of $PD_1$ and actuated through a magnetic coupling path excited from the duty cycle control to provide similar isolation for the operator of the power supply.

FIG. 7 is a detailed schematic circuit diagram of still a different embodiment of the invention wherein the first, high frequency, alternating current gate controlling signal voltage fed back for gate controlling purposes, is derived from across the $C_1$ commutating reactive component of the chopper-inverter power supply circuit. For this purpose, feedback resistor $R_3$ is connected to the juncture of the $L_1$ commutating coil and the $C_1$ commutating capacitor. It should be noted that in the FIG. 7 circuit, the $L_3$ and $C_3$ smoothing components are not included, and consequently, the $L_1$ commutating coil is designed to operate as the induction heating coil.

The first high frequency alternating current gate controlling signal voltage derived from across commutating capacitor component $C_1$, is supplied through resistor $R_3$ and common alternating current coupling capacitor $C_4$ to the base of the first control switching transistor $Q_5$. Similarly, the second alternating current gate controlling signal voltage at the frequency of the high voltage potential appearing across the high voltage power supply terminals 15 and 16 and including the low frequency undulating excitation potential component appearing at the output of full wave rectifier $CR_1$ is supplied through resistor $R_1$ and common alternating coupling capacitor $C_4$ to the base of $Q_5$. By adjustment of the variable resistor $R_0$ the proportion of the first and second alternating current gate controlling signal component can be appropriately adjusted and the magnitude of the overall feedback signal can be controlled by variation of the variable resistor $R_2$ to adjust the start-up behavior near zero supply voltage for all values of loading.

The direct current bias potential supplied to the base of first control switching transistor $Q_5$, is derived from a separate low voltage unfiltered unidirectional current power supply comprised by a supply transformer $T_1$ having its primary winding connected to and supplied from the alternating current supply lines 11 and 12 at a point in advance of the first on-off switch $S_1$. Preferably, a second on-off switch $S_2$ is included in the circuit to control excitation of the primary winding of supply transformer $T_1$, and is ganged with switch $S_1$ in a manner so as to assure closure of switch $S_2$ in advance of switch $S_1$ being closed. Transformer $T_1$ has its secondary winding $T_{1s}$ connected to and supplying a second, separate, low voltage, full wave diode rectifier bridge $CR_2$ having its output supplied across a load resistor $R_{31}$ that in turn is connected through a limiting resistor $R_{32}$ across a voltage regulating zener diode $Z_3$. The output voltage appearing across zener diode $Z_3$ is supplied through a second voltage dropping resistor $R_{33}$ across a series connected string of diodes $D_4$, $D_5$, and $D_6$. The series connected diodes $D_4$, $D_5$ and $D_6$ are connected in series circuit relationship with the resistor $R_4$ between the base of the $Q_5$ transistor and the high voltage power supply terminal 16 with resistor $R_{33}$ being connected to the juncture between $R_4$ and the series diode string.

Figure 3C:
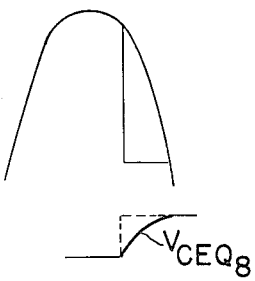

The separate, low voltage direct current power supply through transformer $T_1$ has no filter capacitor so that its output voltage will rise and fall substantially in phase with the alternating current supply line potential at the 120 hertz rate normally produced at the output of a full wave rectifier, assuming that a 60 hertz, conventional residential or commercial alternating current supply line is connected to the input 11 and 12. Because of the closure of $S_2$ in advance of $S_1$ the presence of the DC bias in advance of build-up of voltage on commutating capacitor $C_1$ is assured. Upon initial turn-on of the circuit, first control switching transistor $Q_5$ will be turned-on in the manner previously described with respect to FIG. 2. This, in turn, allows $Q_4$ to turn-on and $Q_3$ to latch-on without firing $Q_2$ until such time that the full 20 volt regulating value of zener diode $Z_1$ builds-up across filter capacitor $C_8$. Upon this occasion, sufficient commutating energy will be stored in the commutating capacitor $C_1$ to allow safe turn-on of the chopper-inverter. Thereafter, upon the next successive current zero in the valley of the ripple (VOR) of the full wave rectified supply potential $V_s$ appearing across the high voltage power supply terminals 15 and 16, $Q_5$ will be turned-off due to the whipping-off action of the $(-dV_4/dt)$ feedback potential applied through resistor $R_1$ at the zero point as was described with relation to FIG. 3($b$). Simultaneously, $Q_4$ turns-off as does $Q_3$. Immediately following the current zero as the supply voltage $V_s$ starts to swing positive, $Q_5$ will again be turned-on both by the positive going DC bias and the positive $(dV_4/dt)$ applied to the base $Q_5$. This then will allow $Q_4$ to turn-on and the timing capacitor $C_5$ to be charged toward the full value of the low voltage direct current supply capacitor $C_8$ through resistors $R_{22}$ and $R_7$, and to fire $Q_3$ and the end of the $t_2$ period thereby supplying a gating-on pulse to pilot switching transistor $Q_2$ and turning-on the large power rated thyristor $Q_1$.

Upon turn-on of $Q_1$, the charge built-up on commutating capacitor $C_1$ is oscillated through the induction heating-commutating coil $L_1$ and the circuit thereafter will continue to operate at its predesigned high operating frequency having a period T as described previously. At this point, the voltage component fed back through resistor $R_3$ from across commutating capacitor $C_1$ will take over and control turn-on and turn-off of $Q_5$ at the high frequency rate in the previously described manner. Control of the output power developed by the circuit is provided by the variation of the feedback resistor $R_2$ to control the magnitude of the feedback voltage supplied through the common coupling capacitor $C_4$. Decreasing this feedback voltage to an essentially zero value will cause the circuit to cease to operate.

The feedback voltage across capacitor $C_4$ assures that the $Q_5$ control switching transistor will continue to be switched on and off by the feedback component at the high frequency rate until just after the bias falls to zero at a zero point of the A.C. line and the feedback component is rapidly decreasing also, whereupon $Q_5$ opens and stays off until the bias again rises positively to turn-on $Q_5$ and to again cause oscillations to ensure for another half cycle.

If the circuit is unloaded the voltage across $C_1$ will be much higher then it is in the loaded state of the circuit. The effect of a high voltage on $C_1$ following the first $t_1$ interval after start-up past a zero point is to allow the rising dc bias potential to capture the base of $Q_5$ and to keep $Q_5$ on following the first one or two cycles of high-frequency oscillation and thereby to stop the oscillation for the rest of the half cycle. Thus, a few high frequency pulses are generated at relatively low line voltage just after each zero point when the circuit is unloaded and the average power consumed is negligibly small.

When the circuit is resistively loaded by inductive coupling to $L_1$, for example, the $C_1$ voltage fails to hold $Q_5$ on beyond a normal $t_2$ period and the rate of rise of the bias voltage does not capture the base of $Q_5$. As a consequence, $Q_5$ is turned-off after a normal $t_2$ period with a simultaneous firing of PUT 3 and of $Q_1$ to maintain oscillation of the circuit for the entire half cycle of line voltage. The oscillations stop short of the next zero point as described and then commence again just beyond that zero point in a repeating fashion for all subsequent half cycles until the load is removed from $L_1$ or line power is turned-off.

The somewhat larger feedback voltage developed across $C_1$ and supplied to $C_4$ under no-load conditions causes $Q_5$ to remain latched in its conducting condition beyond one cycle of the chopper-inverter period so that the dc bias potential takes control of $Q_5$ and the high frequency feedback from $C_1$ is abruptly reduced and oscillations cease after one or two rf pulses are generated. Consequently, when the pan load is removed from the $L_1$ induction heating coil, the circuit of FIG. 7 will cut back to an input power level which is essentially zero so that the standby losses are extremely low and little power is consumed at no load. When a pan load is again placed over the induction heating coil, the circuit will again break into oscillation and operate in the normal manner described above.

It is also observed that the power generated in a pan load using the circuit in FIG. 7 tends to remain constant for wide variations in the intrinsic conductivity of the pan metal and in pan size and many types of pans may be heated at the same rate. This feature comes about due to the change in the $t_1$ and $t_2$ time intervals which follow a tuning of the $L_1$ load coil by the pan load in such a way as to keep pan power nearly constant. It is easily recognized that this behavior is highly desirable in an induction range.

While the circuit shown in FIG. 7 possesses many such desirable characteristics, it does have one inherent disadvantage which is somewhat difficult to overcome. An intermittent sinusoidal current rather than a continuous sinusoidal current flows in the induction heating coil $L_1$ and possesses harmonic components which produce undesired radio frequency emissions of considerable strength, relative to the commutating and inverter frequencies. The pan load disposed over the induction heating coil tends to reduce these emissions but not sufficiently to prevent their being detected. In addition, there is an electro-static coupling between the load coil and the pan load which causes the pan load to assume a potential above ground which contains very high frequency components as well as varying periodically at the inverter frequency. In fact the capacitance between coil and pan is sufficient to cause a substantial current to flow if the pan is connected to a ground point. If a person touches the pan and also a ground point, a high frequency current will pass through his body which is easily sensed. The electro-static coupling to the pan load, may be substantially eliminated by using an electro-static shield shown at $ES_1$ interposed between the induction heating coil and the pan load and designed to permit the oscillating magnetic field to pass through the shield substantially unaffected by the shield. The electro-static shield may be comprised by an array of parallel, highly conductive strips interconnected at their center point and tied to ground in the manner shown at FIG. 7A. Preferably these conductive strips are formed by deposition, spraying, painting, etc. on the under surface of a cool top insulator shown at 49 which may comprise the cool top insulating surface of an electric cooking range in which the induction cooking unit is employed. For a more detailed description of the physical arrangement, operating characteristics and desirable advantages of the cool insulating top 49 when used in conjunction with the induction heating coil $L_1$ and the pan load 51, attention is invited to the above-mentioned copending application Ser. No. 131,648, now U.S. Pat. No. 3,710,062. For the purpose of the present description, it is believed that the sketch shown in FIG. 7C is adequate to illustrate the proposed arrangement for forming the electro-static shield $ES_1$ shown in FIG. 7A on the under surface of the insulating cool top member 49.

FIG. 7B of the drawings illustrates an alternative form of electro-static shield wherein the entire under surface of the cool top insulator 49 over the area in which the $L_1$ induction heating coil is disposed, has a highly resistive, electrically conductive coating of "aquadag" or other similar, highly resistive, electrically conductive coating formed over it to thereby comprise the electro-static shield $ES_1$. For example a coating having a surface resistivity of 1,500 ohms will attenuate the capacitive coupling by over 40 decibles. Negligible power is generated in the coating by magnetically induced currents. In the event that it is desired to use an automatic temperature circuit such as that described in the above-mentioned copending application Ser. No. 131,648, now U.S. Pat. No. 3,710,062, a central opening may be provided in the continuous conductive coating such as shown in FIG. 7B, or alternatively to design the pattern of the conductive strips of the FIG. 7A electro-static shield to provide such an opening to allow pan 51 to be viewed by an infra-red temperature sensor through the opening, and thence through the infra-red transparent cool top insulating member 49.

With an electro-static shielded arrangement $ES_1$ such as shown in FIGS. 7A, 7B and 7C disposed on the under surface of the cool top insulator, or fabricated separately and grounded in the manner indicated, electro-static coupling to the pan load is reduced to a minimum, thereby minimizing any possible shock hazard to an operator of the unit due to electro-static coupling to the pan load. Additionally, the electro-static shield $ES_1$ reduces electro-static radio frequency emission to little or no value at all. It als tends to reduce somewhat electromagnetic radio frequency emission although such reduction is somewhat minimal in nature due to the highly resistive nature of the coating and a desire to prevent it from being heated by the induction field coupled to the pan load 51. Further, while the electro-static shield has been described with relation to FIG. 7, it is employed with equal benefit in the previously described embodiments and with the apparatus disclosed in U.S. patent application Ser. No. 131,648, now U.S. Pat. No. 3,710,062.

FIG. 8 and FIGS. 8A through 8G of the drawings are functional schematic sketches of different structural arrangements for supporting the induction heating coil $L_3$ (or alternatively $L_1$) and for physically moving the induction heating coil towards or away from the metal base pan or other cooking vessel 51 to be heated for power control purposes. By thus moving thd induction heating coil, it is possible to vary, and thereby control the amount of inductive heating that occurs in the pan 51. If the induction heating coil is thus moved for power control purposes, it will not be necessary to include a duty cycle control of the inverter such as shown in FIG. 5. However, it is well to recognize that zero point turn-on and off is accomplished by base control of $Q_6$ of FIG. 5 with a reed switch or light pipe coupling to a photo cell for example without requiring that the main switch $S_1$ be operated. Thus, the inverter may be made responsive to various kinds of actuating signals of very low power including touch control, light beam interception, control of pressure and a temperature of the contents of the cooking vessel, etc. In FIG. 8, the inductive heating coil $L_3$ is shown physically supported within concentric aluminum ring 701 which, in turn, is supported upon a spider 702 fabricated from plastic or some other similar material which is not susceptible to being inductively heated by coil $L_3$. The spider 702, in turn, is secured to a lower cylindrically shaped skirt which is movably supported in the manner of a piston within a concentrically shaped cylinder 704 filled with a hydraulic fluid. The hydraulic fluid communicates through a conduit 705 with a cylinder 706 and piston 707 that is actuated by a control handle 708.

By moving handle 708 in a direction to drive piston 707 downwardly and thus compressing the hydraulic fluid in conduit 705, circular skirt 703 and hence coil $L_3$ will be driven upwardly by the pressure of the fluid acting within the concentric cylinder 704. Conversely, by actuating handle 708 in the opposite direction to raise piston 707, pressure of the hydraulic fluid will allow the circular skirt portion 703 to be lowered within the concentric cylinder 704 thereby lowering spider 702 and the supported induction heating coil $L_3$. It it is desired to employ temperature control, a temperature sensor 54 and associated light chopper 53 can be supported within the space provided within concentric cylinder 704 and allowed to view the bottom of the pan 51 being inductively heated through suitable openings in spider 702 and aperture 709 in induction heating coil $L_3$. Similar openings would be provided in an electro-static shield such as shown in FIG. 7A or 7B formed on the bottom surface of insulating top 49. As described more fully in the abovereferenced copending application Ser. No. 131,648, now U.S. Pat. No. 3,710,062, the cool insulating top 49 on which the pan or other metal base cookware 51 to be inductively heated supported, can be made to be transparent to infra-red rays so that the temperature sensor 54 directly views the bottom of the pan 51 and senses its temperature. The temperature sensor then derives an output signal indicative of the temperature that can be used in controlling further operation of the induction heating coil power supply chopper-inverter to thereby control the temperature of the pan 51 in a manner described more fully in above-referenced application Ser. No. 131,648, now U.S. Pat. No. 3,710,062. The control provided by the temperature sensor 54 is an on-off type of control which, when used in conjunction with physical movement of the $L_3$ induction heating coil in the manner described above, can provide fairly precise control over the temperature of the pan 51.

FIG. 8A of the drawings shows an alternative arrangement for moving coil $L_3$ relative to the pan 55 wherein the $L_3$ coil and supporting aluminum ring 701 are physical secured to the top of a flexible bellows 711 that may be filled with a suitable hydraulic fluid. The flexible bellows 711 communicates with a conduit 712 that is spirally coiled at 713 around a rotatable shaft that, in turn, can be rotated by an operator control knob on the front of the range or other cooking appliance. By rotating the shaft 713 in a counterclockwise direction, more and more of conduit 712 is spirally coiled causing the hydraulic fluid to be forced out of the conduit and expand bellows 711 thereby raising induction heating coil $L_3$. Conversely, by rotating the shaft 713 in a clockwise direction, the flexible conduit 712 is uncoiled thereby allowing greater space to contain the hydraulic fluid and results in flexible bellows 711 being lowered from the position shown and lowering the $L_3$ induction heating coil.

FIG. 8B illustrates a reciprocal arrangement from that shown in FIG. 8A wherein the flexible bellows 711 is connected to the under surface of the cool top insulating support member 49, and the $L_3$ heating coil and its supporting aluminum ring are secured to the under surface of the bellows. With this arrangement, fluid is removed from the bellows through an appropriate control to cause the bellows to contract and raise the induction heating coil toward the pan from a lower position determined by the height of the fully filled and distended bellows, thereby coupling more power into the pan. If desired, a fluid within the bellows 711 and connecting circuit may be employed which has a high coefficient of thermal expansion so that the coil will drop away from the pan as in FIG. 8A wherein the pan heats and in turn heats the fluid.

FIG. 8C illustrates a form of mechanical movement wherein the induction heating coil supporting spider 702 is secured to a threaded shaft 715 that extends downwardly from the spider 702. Shaft 715 is externally threaded and coacts with internal threading formed on a concentric gear rack 716 that, in turn, is driven by a pinion worm gear 717. Pinion 717, in turn, is mounted on a shaft which may be driven by an electric motor in response to up and down control buttons controlling excitation of the motor. The entire apparatus may be enclosed within a housing 718 which preferably is made from plastic or some other material not susceptible to being inductively heated. In operation, the motor driven shaft rotates the worm 717 in one direction to thereby rotate concentric rack 716 and cause the threaded shaft 715 to raise spider 702 (and hence the induction heating coil $L_3$ secured to it). Rototation of the worm 717 in the opposite direction will lower the induction heating coil relative to a pan being heated.

Figure 8D:
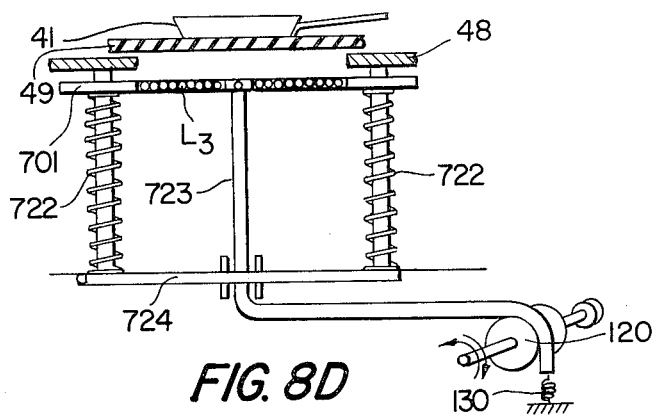

FIG. 8D of the drawings illustrates a simpler and lower cost mechanical lever arrangement wherein the induction heating coil $L_3$ has its surrounding aluminum ring supported to ride up and down on guide pins against the action of springs 722 surrounding the guide pins which act to hold the induction heating coil $L_3$ upward and close to the pan above. The coil is lowered by pulling on a tape or card 723 attached to the coil and extending downward and around a smooth rod or pulley 724 and thence to a remote location where it can be wound on a drum and dial shaft 720. A counter balancing spring 730 can be employed at the end of the tape to reduce the torque required to operate the dial shaft to a minimum and to keep the torque constant for all positions of the dial shaft. The entire assembly is supported from the aluminum sub-platen on which the ceramic platen rests.

Figure 8E:
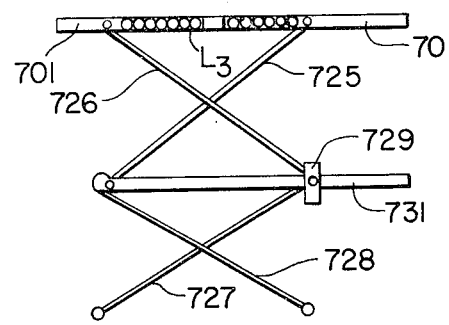

FIG. 8E of the drawings illustrates still a different arrangement for raising and lowering the spirally wound induction heating coil $L_3$ and is supporting aluminum ring 701 by securing the supporting rings 701 to the ends of a pair of crossed legs 725 and 726 of a crossed leg jack having a second set of crossed legs 727 and 728. A traveling nut 729 on a central, threaded, rotatable shaft 731 has the ends of the supporting rods 726 and 727 secured thereto so that by rotation of the shaft 731, nut 729 is caused to travel to the right or to the left thereby raising or lowering the plane of the induction heating coil $L_3$. Rotatable shaft 731 may extend outside the front panel of a cooking range or other home appliance and is secured to and rotatable by a control knob (not shown) that may be grasped by an operator. Rotation of the shaft 31 by the operator will cause the supporting leg member 725 and 726 to be raised or lowered in the manner of a conventional auto jack to thereby raise or lower the plane of the induction heating coil $L_3$ relative to the pan or other metal base utensil disposed over the coil.

Figure 8F:
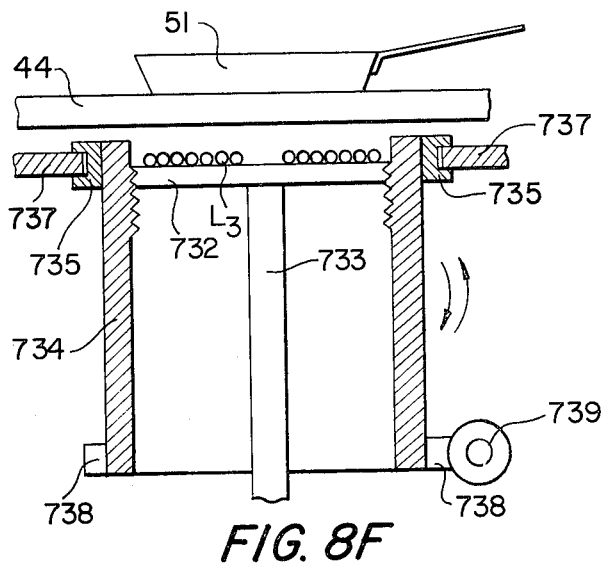

FIG. 8F of the drawings illustrates still another arrangement for physically raising and lowering the plane of the $L_3$ induction heating coil relative to the bottom of a pan 51 supported on the cool top insulating supporting surface 49. In FIG. 8F, induction heating coil $L_3$ is secured to and supported on an aluminum support ring 732 having a flexible cable 733 connected thereto for supplying excitation current to the $L_3$ induction heating coil. The outer edge of the aluminum supporting ring 732 is threaded and coacts with internal threading formed on a rotatable surrounding cylinder 734. Cylinder 734 has a pair of outwardly extending flanges 735 and 736 rotatably supporting the cylinder on guides 737 that, in turn, are secured to the housing of a range or other housing in which the induction heating unit is mounted. The lower skirt of the rotatable cylinder 34 has a circular gear-toothed rack 738 secured around its outer periphery and coacting with a worm gear 739. Worm gear 739, in turn, is secured to a rotatable shaft that extends out to a control panel of the cooking range for rotation by an operator control knob. By rotation of the worm gear 739, cylinder 734 may be rotated relative to the internally threaded aluminum support ring 732 for induction heating coil $L_3$. By rotation of cylinder 734 in one direction, the $L_3$ induction heating coil may be raised relative the bottom of the pan 51, and by rotation in the opposite direction, the heating coil will be lowered thereby providing linear control over the amount of magnetic coupling to the pan 51.

Figure 8G:
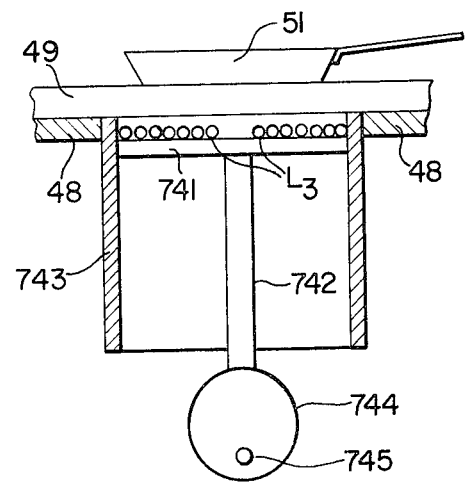

FIG. 8G of the drawings illustrates still a different constuction for moving the $L_3$ induction heating coil relative to pan 51 for power control purposes. In FIG. 8G, induction heating coil $L_3$ is secured on an aluminum supporting ring 741 that may be reciprocated upwardly and downwardly within a fixed cylinder 473 secured to the range housing 48 and which also supports the cool top insulating support member 49 on which the pan 51 is rested. The aluminum supporting ring 741 is secured to a connecting rod 42 which has its lower end riding on an eccentric cam 744. The eccentric cam 744, in turn, is keyed to a rotatable shaft 745 that extends out to a control panel of the range and may be rotated by an operator control knob for the unit. If desired, coil compression springs may be wound around the connecting rod 742 to bias the aluminum supporting ring and connecting rod 742 upwardly thereby relieving somewhat the loading on the eccentric cam 744. By appropriate rotation of eccentric cam 744 to the position shown in FIG. 8G, maximum induction coupling and hence maximum heating of the pan 51 will occur. Upon rotation of the cam 744 in a clockwise direction downwardly, the induction heating coil $L_3$ will be lowered downwardly thereby reducing the magnetic coupling to the pan and effectively reducing the heating action on the pan.

Figure 8H:
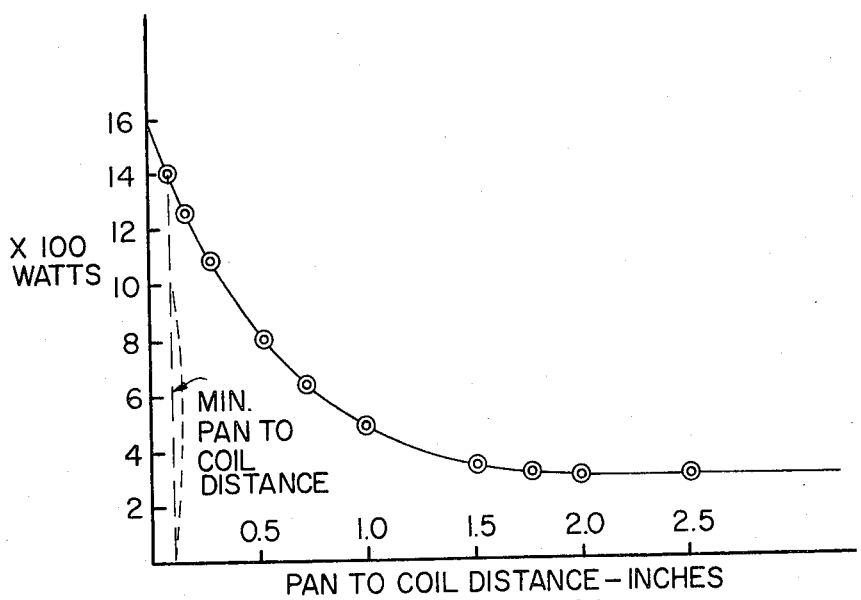
FIG. 8H is a plot of the heating power induced in metal base cookware by an induction heating coil versus distance or position of the heating coil relative to the bottom of the inductively heated cookware.

FIG. 8H of the drawings is a characteristic curve illustrating the output power supplied by an induction heating coil $L_3$ (or $L_1$) to an inductively heated load versus the distance between the induction heating coil and the inductively heated load. In the example shown the induction heating coil is positioned immediately under a stainless steel pan load having a diameter equal to or greater than that of the coil. A maximum power of about 1400 watts is transferred to the loads using an inverter connected as in FIG. 5 and operating from an input A.C. source of 110–120 volts, 15–20 amps. As the distance is increased, the transferred power drops off sharply and then levels off asymptotically to a standby power level of about 250 watts when the spacing becomes about 2 inches between the top of the induction heating coil and the bottom of the pan or other metal base cookware being inductively heated. From a consideration of FIG. 8H, it will be appreciated that from maximum to fairly low power the control is substantially linear with coil-to-pan spacing. Accordingly, mechanical movement of either the $L_3$ or the $L_1$ induction heating coil toward and away from the pan or other metal base cookware being inductively heated provides a fairly linear and satisfactory method of controlling power supplied to a pan load and hence of the heating action. A difficulty with mechanical control over load power is that the no-load stand-by power consumption of the induction heating coil and inverter circuitry remains constant and reduces the overall efficiency of the induction heating unit when the coil is delivering a low level of power to the pan. In contrast the high and low power efficiencies of the unit are the same when duty cycle modulation is employed, since the coil to pan spacing is not changed.

In addition to the above-described techniques for control of power, it is also possible to use the $C_1$ or $C_3$ capacitor switching techniques disclosed in copending U.S. patent application Ser. No. 131,648, now U.S. Pat. No. 3,710,062, with the circuits herein described. With such arrangements, the inhibit imposed during switching of the capacitor components would be applied to inhibit transistor $Q_6$ of FIG. 5, for example, to prevent high frequency operation of the circuit during the capacitor switching operation.

Figure 9A:
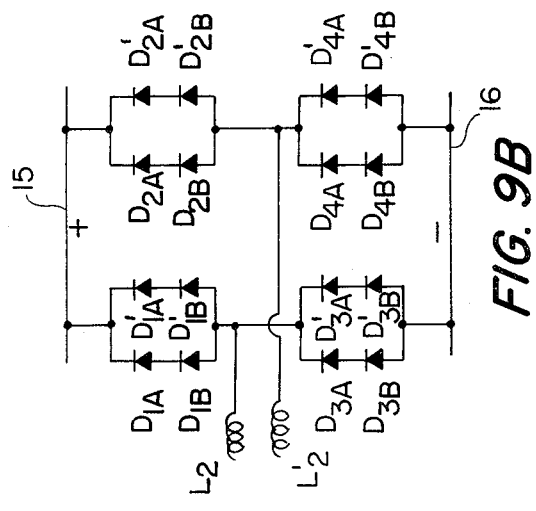
FIGS. 9, 9A and 9B illustrate different higher power connections using multiple silicon control rectifiers and diode rectifiers of a given power rating, and show the manner in which higher power circuits operating at increased voltage and/or increased current can be fabricated in accordance with the invention.
Figure 9B:
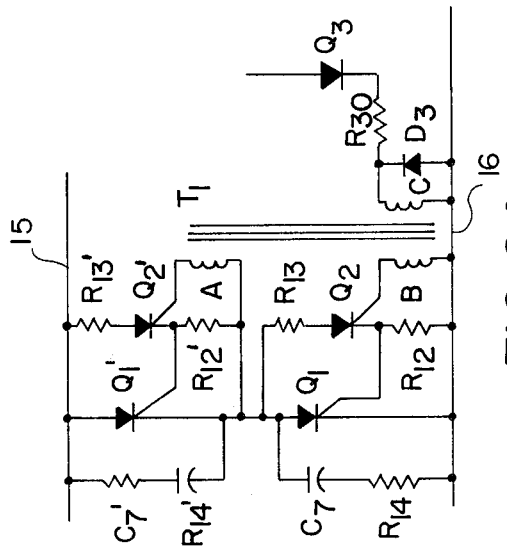
Figure 9:
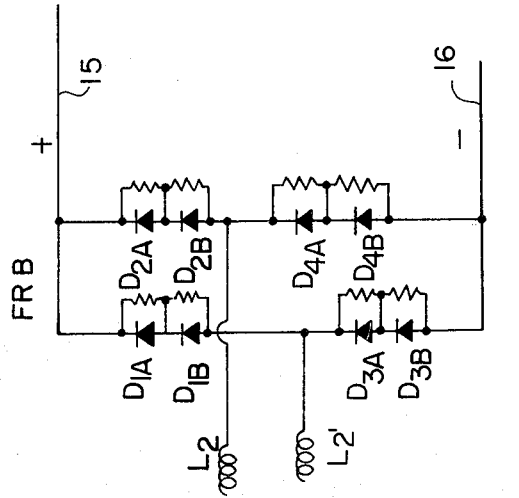

FIGS. 9, 9A and 9B illustrate alternative higher power circuit construction that can be employed with thyristor devices and power supply diode rectifiers of a given power rating, in order to utilize such devices in circuits designed to operate at higher power levels. For example, if it is desired to operate the circuits of FIGS. 2, 5 and 7 with 240 volt, 30–50 amp conventional residential or commercial alternating current supply sources, it may desirable to utilize the arrangements of FIGS. 9, 9A or 9B. In FIG. 9, by connecting two diodes such as $D_{1A}$ and $D_{1B}$ of a given rating in series circuit relationship in each leg of the full wave diode rectifier bridge $CR_1$, and providing voltage dividing resistors spanning the series connected diodes with the juncture of the diodes being connected to the mid-tap point of the voltage dividing resistors, it would be possible to provide operation at double the voltage rating of each diode. It is also desired to increase the current rating of the circuit, two such arrangements connected in parallel in each leg of the diode rectifier bridge as shown in FIG. 9B could be employed to thereby double not only the voltage rating, but also double the current rating of the bridge. Obviously, further extension of this concept could provide increased voltage and current rating to any desired level.

With respect to increasing the operating voltage for any given power rated thyristor device $Q_1$, it is possible to connect two thyristors in series in the manner shown in 9A to achieve a doubling of the voltage rating of the circuit. As shown in FIG. 9A, individual snubbing circuits $C_7$, $R_{14}$ for reducing the initial ($dV/dt$) effect of the reapplied forward voltage across each $Q_1$ thyristor are provided for each of the series connected thyristors. Similarly, each thyristor has its own $Q_2$ pilot switching SCR, with the $Q_2$ pilot switching SCR's being excited in common from a single pulse transformer $T_1$. Transformer $T_1$ has multiple secondary windings A and B and a single primary winding C that is inductively coupled in common through a suitable ferrite core to each of the multiple secondary windings A and B. The primary winding C then, is connected in the cathode circuit of the PUT $Q_3$ and results in producing simultaneous gating-on pulses in each of the secondary windings A and B upon PUT $Q_3$ being rendered conductive with its timing $C_5$ capacitor substantially fully charged. In all other respects, the increased power circuits of FIGS. 9, 9A and 9B will operate in a similar manner to that described previously in connection with FIGS. 2, 5 and 7. Hence, a further description of the higher power rated circuit is believed unnecessary.

From the foregoing description, it will be appreciated that the present invention provides a new and improved low cost and efficient A.C. to R.F. induction cooking unit power supply for use primarily in domestic cooking ranges for inductively heating metal base cookware made from ferromagnetic material but which will not be damged if used with other available cookware made from aluminum, copper or other highly conductive material. The power supply is designed to directly convert alternating current to high frequency excitation current for an induction heating coil without first converting the input alternating current to stiff direct current and operates at substantially unity power factor and with unity form factor for all values of loading from no-load to full-load. Linear control of the output power developed by the power supply is achieved with an electrical control from 0 to 100 percent of full power in a smooth, stepless manner, or alternatively may employ mechanical movement of the induction heating coil for power control purposes. By appropriate modification of the circuit, the units can be operated at either low or high power levels with only relatively simple and comparatively inexpensive modifications required to adapt the circuits to operate at either level.

Having described several embodiments of a new and improved A.C. to R.F. chopper-inverter circuit for induction cooking units constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. An induction heating unit power supply including in combination high voltage power supply terminal means for supplying a low frequency, high voltage undulating excitation potential, high frequency chopper-inverter circuit means connected to and supplied by said high voltage power supply terminal means and including serially connected capacitor and inductor commutating reactive components with said commutating inductor reactive components comprising an induction heating coil, said chopper-inverter circuit means further including power rated thyristor means connected to and supplied by said high voltage power supply terminal means in parallel circuit relationship with said serially connected capacitor and inductor commutating reactive components, low voltage direct current power supply means supplied in common with said high voltage power supply terminal means, gating circuit means supplied from said low voltage direct current power supply means and coupled to and controlling gating-on of said power rated thyristor means, said chopper-inverter circuit means upon repetitive turn-on of the thyristor means by the gating circuit means thereafter operating in the manner of a serially commutated chopper-inverter to supply high frequency current through the induction heating coil, said gating circuit means comprising means connected across one of the reactive commutating components for deriving a first high frequency alternating current gate controlling signal voltage at substantially the operating frequency of the chopper-inverter, means connected to said high voltage powers supply terminal means for deriving a second alternating current gate controlling signal voltage at the frequency of the high voltage potential appearing across the high voltage power supply terminal means and including the low frequency undulating excitation potential component, gating signal generator means for deriving high frequency output gating signal pulses upon being enabled which are of sufficient magnitude to assure safe turn-on of the power rated thyristor means, said gating signal generator means being energized from said low voltage direct current power supply means and having the output thereof coupled to and controlling turn-on of the power rated thyristor means, control switch means coupled to and enabling operation of the gating signal generator means, direct current bias circuit means supplied from said low voltage direct current power supply means and connected to and supplying direct current bias potential to said control switch means, and common alternating current coupling means coupling said first high frequency alternating current gate controlling signal voltage and said second alternating current gate controlling signal voltage in common to said control switch means to control the operation thereof in conjunction with the direct current bias potential whereby zero point switching on and initial turn-on of the thyristor means is achieved only at or near the zero points of the high voltage undulating excitation potential to thereby provide unity power factor operation of the induction heating unit power supply with unity form factor whereby nearly sinusoidal line current supply is drawn for all values of loading from no-load to full-load without requiring substantial supply line filtering components.

2. An induction heating unit power supply according to claim 1 further including delay means coupled to said control switch means for delaying enabling action of said first control switch means upon initial turn-on of the induction heating unit power supply whereby premature firing of the power rated thyristor means is prevented in advance of sufficient commutating energy being stored in the commutating reactive components of the circuit.

3. An induction heating unit power supply according to claim 1 further including second delay means connected to said control switch means for delaying prolonged turn-off of said thyristor means beyond high frequency operating cycle of the chopper-inverter circuit means until a zero point of the high voltage undulating excitation potential occurs.

4. An induction heating unit power supply according to claim 3 wherein the high voltage power supply terminal means are connected to and supplied from a full wave diode rectifier bridge excited from a conventional alternating current source of potential for providing the low frequency, high voltage undulating excitation potential, and wherein the full wave rectifier bridge is a fast recovery diode bridge and the power rated thyristor means is unidirectional conducting with the fast recovery diode bridge serving the dual function of a full wave rectifier of the supply alternating current potential and also to provide feedback of reverse currents around the unidirectional conducting thyristor means, the high frequency chopper-inverter circuit means further includes a filter inductor having an inductance $L_2$ and the power rated thyristor means is connected in series circuit relationship with the filter inductor across the alternating current source of supply, and wherein the inductor and capacitor commutating reactive components have an inductance $L_1$ and a capacitance $C_1$ respectively, and are connected in series circuit relationship across the power rated thyristor means and are tuned to series resonance at a desired commutating frequency that provides a combined thyristor conduction and commutating period $t_1$ during each cycle of operation, and wherein the gating circuit means controlling turn-on of the thyristor means renders the thyristor means conductive at a controlled frequency of operation that provides an operating period T for the chopper-inverter circuit means including a quiescent charging period $t_2$ in each cycle of operation where $T = t_1 + t_2$ such that the value $\omega_2 t_2$ equals substantially $\pi/2$ radians at the operating frequency or greater and where $\omega_2$ equals $$\sqrt{\frac{1}{L_2 C_1}}$$

whereby the reapplied forwarded voltage across the silicon control rectifier means independent of load, and further including a smoothing inductor having an inductance $L_3$ and a smoothing capacitor having a capacitance $C_3$ connected in series circuit relationship and comprising a part of the capacitor and inductor commutating reactive components and having inpedance values such that the combined reactive impedance of the capacitor commutating reactive components including the smoothing inductor and the smoothing capacitor is capacitive in nature and series resonates with the inductive commutating component to establish the combined thyristor conduction and commutating period $t_1$, and wherein the smoothing inductor and capacitor shape the output current flowing through the smoothing inductor to substantially a sinusoidal wave shape having little or no radio frequency interference emission effects, the smoothing inductor comprises the induction heating coil, and the first high frequency alternating current gate controlling signal voltage is derived from across the $L_3$ smoothing and induction heating coil.

5. An induction heating unit power supply according to claim 1 further including duty cycle control means coupled to and controlling action of said control switch means independently of and in conjunction with the direct current bias potential and the common alternating current coupling means to thereby provide duty cycle control of the output power supplied to the induction heating coil.

6. An induction heating unit power supply according to claim 5 wherein the duty cycle control means includes electro-optical coupling means between an operator control knob for the duty cycle control means and the connection to the control switch means for providing electrical isolation between the induction heating unit power supply and an operator of the unit.

7. An induction heating unit power supply according to claim 5 wherein said gating signal generator means comprises a programmable unijunction transistor having an anode, anode-gate and cathode, biasing resistor means connected to the anode and to the anode gate, timing capacitor means connected to the anode and charged through the anode biasing resistor means, said control switch means being interconnected between the low voltage direct current power supply means and the biasing resistor means connected to the anode and anode-gate of the programmable unijunction transistor for controlling application of excitation potential through the biasing resistor means to the programmable unijunction transistor, said control switch means comprises transistor switching means having a base electrode connected to the common alternating current coupling means and the direct current bias circuit means, and said delay means comprises a zener diode connected to and controlling the value of the direct current bias supplied to the base of the transistor switching means.

8. An induction heating unit power supply according to claim 7 further including duty cycle control means coupled to and controlling the value of the direct current bias supplied to the base of the transistor switching means independently of the delay means, and the duty cycle control means comprises unijunction transistor relaxation oscillator means coupled to and excited from said low voltage direct current power supply for generating a ramp timing signal, field effect transistor follower amplifier means connected to the output from said unijunction transistor relaxation oscillator means, linearly adjustable transistor amplifier means coupled to the output from said field effect transistor follower amplifier means and having linearly variable resistor means for controlling the percent of on-time of the transistor amplifier in response to the ramp timing signal from 0 to 100 percent, and on-off inhibit transistor means coupled to the output from the adjustable transistor amplifier means and connected to and controlling operation of the transistor switching means whereby the percent on-time of the inhibit transistor means may be linearly controlled from 0-100 percent through adjustment of the linearly variable resistor means by an operator of the unit.

9. An induction heating unit power supply according to claim 1 wherein the high voltage power supply terminal means is connected to and supplied from a diode full wave rectifier bridge excited from a conventional alternating current source of potential for providing the low frequency, high voltage undulating excitation potential, and wherein the full wave rectifier bridge is a fast recovery diode bridge and the power rated thyristor means is unidirectional conducting with the fast recovery diode bridge serving the dual function of a full wave rectifier of the supply alternating current potential and also to provide feedback of reverse currents around the unidirectional conducting thyristor means.

10. An induction heating unit power supply according to claim 1 wherein the high frequency chopper-inverter circuit means further includes a filter inductor having an inductance $L_2$ and the power rated thyristor means is connected in series circuit relationship with the filter inductor across the alternating current source of supply, and wherein the inductor and capacitor commutating reactive components having an inductance $L_1$ and a capacitance $C_1$ respectively, are connected in series circuit relationship across the power rated thyristor means and are turned to series resonance at a desired commutating frequency that provides a combined thyristor conduction and commutating period $t_1$ during each cycle of operation, and wherein the gating circuit means controlling turn-on of the power rated thyristor means renders the thyristor means conductive at a controlled frequency of operation that provides an operation period T for the chopper-inverter circuit means including a quiescent charging period $t_2$ in each cycle of operation where $T = t_1 + t_2$ such that the value $\omega_2 t_2$ equals substantially $\pi/2$ radians at the operating frequency or greater and where $\omega_2$ equals $$\sqrt{\frac{1}{L_2 C_1}}$$

whereby the reapplied forwarded voltage across the thyristor means following each conduction interval is maintained substantially independent of load.

11. An induction heating unit power supply according to claim 10 wherein the first high frequency alternating current gate controlling signal voltage is derived from across the $C_1$ capacitor commutating reactive component.

12. An induction heating unit power supply according to claim 11 wherein the high voltage power supply terminal means are connected to and supplied from a full wave diode rectifier bridge excited from a conventional alternating current source of potential for providing the low frequency, high voltage undulating excitation potential, and wherein the full wave rectifier bridge is a fast recovery diode bridge and the power rated thyristor means is unidirectional conducting with the fast recovery diode bridge serving the dual function of a full wave rectifier of the supply alternating current potential and also to provide feedback of reverse currents around the unidirectional conducting thyristor means with the filter inductor being connected intermediate the full wave rectifier bridge and the source of alternating current, a separate low voltage direct current power supply source comprised by a supply transformer coupled to a common source of alternating current supply with the high voltage power supply terminal means and further including a separate diode rectifier bridge for deriving a separate direct current bias potential for application to the first control means, and wherein the high frequency alternating current gating signal voltage derived from across the capacitor commutating reactive component and supplied through the common alternating current coupling means to control operation of the first control means is applied thereto in common with the separate direct current bias potential across a common load impedance.

13. An induction heating unit power supply according to claim 12 wherein said gating signal generator means comprises a programmable unijunction transistor having an anode, anode-gate and cathode, biasing resistor means connected to the anode and to the anode-gate, timing capacitor means connected to the anode and charged through the anode biasing resistor means, said control switch means being interconnected between the low voltage direct current power supply means and the biasing resistor means connected to the anode and anode-gate of the programmable unijunction transistor for controlling application of excitation potential through the biasing resistor means to the programmable unijunction transistor, said first control switch means comprises transistor switching means having a base electrode connected to the common alternating current coupling means and the direct current bias potential for controlling application of excitation potential to the programmable unijunction transistor and delay means comprising a zener diode device connected to and controlling turn-on of said transistor switching means upon initial turn-on of the induction heating unit power supply whereby premature firing of the power rated thyristor means is prevented in advance of sufficient commutating energy being stored in the commutating reactive components of the circuit.

14. An induction heating unit power supply according to claim 13 further including power control means coupled to and controlling action of said first control means independently of and in conjunction with the direct current bias potential and the common alternating current coupling means to thereby provide control of the output power supplied to the induction heating coil.

15. An induction heating unit power supply according to claim 14 wherein the induction heating coil comprises a planar, spirally wound induction heating coil, a flat, insulating support member for supporting inductively heated cooking vessels disposed over the induction heating coil, and electro-static shield means formed on the under surface of the flat, insulating support member for electro-statically shielding the inductively heated cooking vessels from the induction heating coil, the electro-static shielding means being electrically grounded.

16. An induction heating unit power supply according to claim 15 wherein the power rated thyristor means comprises a plurality of serially connected power rated thyristor devices connected in series circuit relationship across the high voltage power supply terminal means and having respective gating electrodes, and further including gating transformer means having a plurality of secondary windings and a single primary winding, the single primary winding being excited from said gating signal generator means, and the respective secondary windings being coupled to and controlling the gating potential supplied to the respective gating electrodes of the plurality of serially connected power rated thyristor means, and further including a plurality of diode rectifier devices interconnected in series and/or parallel circuit relationship in each branch of the diode rectifier bridge for supplying higher voltages and/or current to the induction heating unit power supply.

17. An induction heating unit power supply according to claim 13 further including means for physically moving the induction heating coil towards and away from an object to be inductively heated whereby the magnetic induction field inductively coupled to the object to be heated can be varied for power control purposes.

18. An induction heating unit power supply according to claim 17 wherein the induction heating coil comprises a planar, spirally wound induction heating coil, a flat, insulating support member for supporting inductively heated cooking vessels disposed over the induction heating coil, and electro-static shield means formed on the under surface of the flat, insulating support member for electro-statically shielding the inductively heated cooking vessels from the induction heating coil, the electro-static shielding means being electrically grounded.

19. An induction heating unit power supply according to claim 18 wherein the power rated thyristor means comprises a plurality of serially connected power rated thyristor devices connected in series circuit relationship across the high voltage power supply terminal means and having respective gating electrodes, and further including gating transformer means having a plurality of secondary windings and a single primary winding, the single primary winding being excited from said gating signal generator means, and the respective secondary windings being coupled to and controlling the gating potential supplied to the respective gating electrodes of the plurality of serially connected power rated thyristor means, and further including a plurality of diode rectifier devices interconnected in series and/or parallel circuit relationship in each branch of the diode rectifier bridge for supplying higher voltages and/or current to the induction heating unit power supply.

20. An induction heating unit power supply according to claim 1 further including temperature responsive means thermally coupled to sense at least one operating temperature condition of the induction heating unit and means coupling the output from said temperature responsive means to control action of said control switch means independently of and in conjunction with the direct current bias potential and the common alternating current coupling means.

21. An inducation heating unit power supply according to claim 1 further including a smoothing inductor having an inductance $L_3$ and a smoothing capacitor having a capacitance $C_3$ connected in series circuit relationship and comprising a part of the capacitor and inductor commutating reactive components and having impedance values such that the combined reactive impedance of the capacitor commutating reactive components including the smoothing inductor and the smoothing capacitor is capacitive in nature and series resonates with the inductor commutating components to establish a combined thyristor conduction and commutating period $t_1$, and wherein the smoothing inductor and capacitor shape the output current flowing through the smoothing inductor to substantially a sinusoidal wave shape having little or no radio frequency interference emission effects, and the smoothing inductor comprises the induction heating coil.

22. An induction heating unit power supply according to claim 21 wherein the first high frequency alternating current gate controlling signal voltage is derived from across the $L_3$ smoothing and induction heating coil, and the common alternating current coupling means comprises differentiating circuit coupling means.

23. An induction heating unit power supply according to claim 1 further including second control switch means connected to and controlling the value of the direct current bias applied to said first mentioned control switch means for controlling the operation thereof, and delay means comprising a part of the second control switch means for delaying enabling action of said first mentioned control switch means by said second control switch means upon initial turn-on of the induction heating unit power supply whereby premature firing of the power rated thyristor means is prevented in advance of sufficient commutating energy being stored in the commutating reactive components of the circuit.

24. An induction heating unit power supply according to claim 23 further including a smoothing inductor having an inductance $L_3$ and a smoothing capacitor having a capacitance $C_3$ connected in series circuit relationship and comprising a part of the commutating components and having impedance values such that the combined reactive impedance of the capacitive commutating reactive components including the smoothing inductor and the smoothing capacitor is capacitive in nature and series resonate with the inductor commutating components to establish a combined thyristor conduction and commutating period $t_1$, and wherein the smoothing inductor and capacitor shape the output current flowing through the smoothing conductor to substantially a sinusoidal wave shape having little or no radio frequency interference emission effects, and the smoothing inductor comprises the induction heating coil.

25. An induction heating unit power supply according to claim 24 wherein the high voltage power supply terminal means is connected to and supplied from a full wave diode rectifier bridge excited from a conventional alternating current source of potential for providing the low frequency, high voltage undulating excitation potential, and wherein the full wave rectifier bridge is a fast recovery diode bridge and the power rated thyristor means is unidirectional conducting with the fast recovery diode bridge serving the dual function of a full wave rectifier of the supply alternating current potential and also to provide feedback of reverse currents around the unidirectional conducting thyristor means, a filter inductor having an inductance $L_2$ connected intermediate the full wave rectifier bridge and the alternating current source of potential with the filter inductor and power rated thyristor means being connected effectively in series circuit relationship across the alternating current source of supply, and wherein the inductor and capacitor commutating reactive components having an inductance $L_1$ and a capacitance $C_1$ respectively, are connected in series circuit relationship across the power rated thyristor means and are tuned to series resonance at a desired commutating frequency that provides a combined thyristor conduction and commutating period $t_1$ during each cycle of operation, and wherein the gating circuit means controlling turn-on of the thyristor means renders the thyristor means conductive at a controlled frequency of operation that provides an operating period T for the chopper-inverter circuit including a quiescent charging period $t_2$ in each cycle of operation where $T = t_1 + t_2$ such that the value $\omega_2 t_2$ equals substantially $\pi/2$ radians at the operating frequency of the chopper-inverter or greater and where $\omega_2$ equals $1/\sqrt{L_2 C_1}$ whereby the reapplied forwarded voltage across the thyristor means following each conduction interval is maintained substantially independent of load.

26. An induction heating unit power supply according to claim 25 wherein the first high frequency alternating current gate controlling signal voltage is derived from across the $L_3$ smoothing and induction heating coil, and the common alternating current coupling means comprises differentiating circuit coupling means.

27. An induction heating unit power supply according to claim 26 further including temperature responsive means thermally coupled to sense at least one operating temperature condition of the induction heating unit and means coupling the output from the temperature responsive means to control operation of the second control switch means.

28. An induction heating unit power supply according to claim 26 wherein the power rated thyristor means comprises a plurality of serially connected power rated thyristor devices connected in series circuit relationship across the high voltage power supply terminal means and having respective gating electrodes, and further including gating transformer means having a plurality of secondary windings and a single primary winding, the single primary winding being excited from said gating signal generator means, and the respective secondary windings being coupled to and controlling the gating potential supplied to the respective gating electrodes of the plurality of serially connected power rated thyristor means, and further including a plurality of diode rectifier devices interconnected in series and/or parallel circuit relationship in each branch of the diode rectifier bridge for supplying higher voltages and/or current to the induction heating unit power supply.

29. An induction heating unit power supply according to claim 28 wherein the induction heating coil comprises a planar, spirally wound induction heating coil, a flat, insulating support member for supporting cooking vessels to be inductively heated disposed over the induction heating coil, and electrostatic shield means formed on the under surface of the flat, insulating support member for electro-statically shielding the inductively heated cooking vessels from the induction heating coil, the electro-static shielding means being electrically and thermally grounded.

30. An induction heating unit power supply according to claim 29 further including duty cycle control means having electro-optical coupling means between an operator control knob for the duty cycle control means and the connection to the second control switch means for providing electrical isolation between the induction heating unit power supply and an operator of the unit.

31. An induction heating unit power supply according to claim 26 wherein said gating signal generator means comprises a programmable unijunction transistor having an anode, anode-gate and cathode, biasing resistor means connected to the anode and to the anode-gate, timing capacitor means connected to the anode and charged through the anode biasing resistor means, said first mentioned control switch means being interconnected between the low voltage direct current power supply means and the biasing resistor means connected to the anode and anode-gate of the programmable unijunction transistor for controlling application of excitation potential to the programmable unijunction transistor, said first mentioned control switch means comprises first transistor switching means having a base electrode connected to the common alternating current coupling means and the direct current bias circuit means, the common alternating current coupling means comprises a part of differentiating circuit means for differentiating the first high frequency alternating current gate controlling signal voltage, said second control switch means comprises second transistor switching means connected to and controlling the value of the direct current bias potential supplied to the base of the first transistor switching means, and said delay means comprises a zener diode device connected to and controlling turn-on of said second transistor switching means.

32. An induction heating unit power supply according to claim 31 wherein said duty cycle control means comprises unijunction transistor relaxation oscillator means coupled to and excited from said low voltage direct current power supply for generating a ramp timing signal, field effect transistor follower amplifier means connected to the output from said unijunction transistor relaxation oscillator, linearly adjustable transistor amplifier means coupled to the output from said field effect transistor follower amplifier means and having linearly variable resistor means for controlling the percent of on-time of the transistor amplifier in response to the ramp timing signal from 0 to 100 percent, and means and connected to and inhibit transistor means coupled to the output from the adjustable transistor amplifier and connected to and controlling operation of the second transistor switching means whereby the percent of on-time of the inhibit transistor means may be linearly controlled from 0 to 100 percent of full power through adjustment of the linearly variable resistor means by an operator of the unit.

33. An induction heating unit power supply according to claim 32 wherein the induction heating coil comprises a planar, spirally wound induction heating coil, a flat, insulating support member for supporting inductively heated cooking vessels disposed over the induction heating coil, and electro-static shield means formed on the under surface of the flat, insulating support member for electro-statically shielding the inductively heated cooking vessels from the induction heating coil, the electro-static shielding means being electrically and thermally grounded.

34. An induction heating unit power supply according to claim 33 wherein the power rated thyristor means comprises a plurality of serially connected power rated thyristor devices connected in series circuit relationship across the high voltage power supply terminal means and having respective gating electrodes, and further including gating transformer means having a plurality of secondary windings and a single primary winding, the single primary winding being excited from said gating signal generator means, and the respective secondary windings being coupled to and controlling the gating potential supplied to the respective gating electrode of the plurality of serially connected power rated thyristor means.

35. An induction heating unit power supply according to claim 25 further including duty cycle control means wherein said duty cycle control means comprises unijunction transistor relaxation oscillator means coupled to and supplied by said low voltage direct current power supply means for developing a timing ramp signal, field effect transistor follower amplifier means and linearly controllable transistor amplifier means supplied from said low voltage direct current power supply means, said field effect transistor follower amplifier means serving to couple the timing ramp signal developed by the unijunction transistor relaxation oscillator means to the linearly controllable transistor amplifier means as an input, and the linearly controllable transistor amplifier being adjustable by an operator to derive an output power control signal representative of from 0 to 100% of the timing ramp signal, and means coupling the output power control signal to the second control switch means to control the operation thereof.

36. An induction heating unit power supply according to claim 35 further including temperature responsive means thermally coupled to sense at least one operating temperature condition of the induction heating unit and means coupling the output from the temperature responsive means to control operation of the second control switch means.

37. An induction heating unit power supply according to claim 25 further including means for physically moving the induction heating coil towards and away from an object to be inductively heated whereby the magnetic induction field inductively coupled to the object to be heated can be varied for power control purposes.

38. An induction heating unit power supply according to claim 25 wherein the induction heating coil comprises a planar, spirally wound induction heating coil, a flat, insulating support member for supporting cooking vessels to be inductively heated disposed over the induction heating coil, and electrostatic shield means formed on the under surface of the flat, insulating support member for electro-statically shielding the inductively heated cooking vessels from the induction heating coil, the electro-static shielding means being electrically grounded.

39. An induction heating unit power supply according to claim 1 further including means for physically moving the induction heating coil towards and away from an object to be inductively heated whereby the magnetic induction field inductively coupled to the object to be heated can be varied for power control purposes.

40. An induction heating unit power supply according to claim 1 wherein the induction heating coil comprises a planar, spirally wound induction heating coil, a flat, insulating support member for supporting cooking vessels to be inductively heated disposed over the induction heating coil, and electrostatic shield means formed on the under surface of the flat, insulating support member for electro-statically shielding the inductively heated cooking vessels from the induction heating coil, the electro-static shielding means being electrically grounded.

41. An induction heating unit power supply according to claim 1 wherein the power rated thyristor means comprises a plurality of serially connected power rated thyrsitor devices connected in series circuit relationship across the high voltage power supply terminal means and having respective gating electrodes, and further including gating transformer means having a plurality of secondary windings and a single primary winding, the single primary winding being excited from said gating signal generator means, and the respective secondary windings being coupled to and controlling the gating potential supplied to the respective gating electrodes of the plurality of serially connected power rated thyristor devices.

42. An induction heating unit for an inductively heated cooking vessel comprising a planar, spirally wound induction heating coil, high frequency inverter circuit means coupled to and exciting said induction heating coil with high frequency electric currents, a flat, insulating support member physically disposed over the induction heating coil for supporting a cooking vessel to be inductively heated by the induction heating coil, and electrostatic shielding means physically disposed intermediate the induction heating coil and the flat insulating supporting member for electrostatically shielding the inductively heated cooking vessel, and grounding means for grounding high frequency electric currents electrostatically induced in the electrostatic shielding means.

43. An induction heating unit according to claim 41 wherein the electrostatic shielding means is physically formed on the under surface of the support member in the form of a conductive surface having at least one common grounding point.

44. An induction heating unit power supply including in combination high voltage power supply terminal means for supplying a low frequency, high voltage undulating excitation potential, high frequency inverter circuit means connected to and supplied by said high voltage power supply terminal means and including capacitor and inductor commutating reactive components with said commutating inductor reactive components comprising an induction heating coil, said inverter circuit means further including power rated thyristor means connected to and supplied by said high voltage power supply terminal means and connected in circuit relationship with said serial capacitor and inductor commutating reactive components, low voltage direct current power supply means supplied in common with said high voltage power supply terminal means, gating circuit means supplied from said low voltage direct current power supply means and coupled to and controlling gating-on of said power rated thyristor means, said inverter circuit means upon repetitive turn-on of the thyristor means by the gating circuit means thereafter operating to supply high frequency current through the induction heating coil, said gating circuit means comprising means connected across one of the commutating reactive components for deriving a first high frequency alternating current gate controlling signal voltage at substantially the operating frequency of the inverter, means connected to said high voltage power supply terminal means for deriving a second alternating current gate controlling signal voltage at the frequency of the high voltage potential appearing across the high voltage power supply terminal means and including the low frequency undulating excitation potential component, gating signal generator means for deriving high frequency output gating signal pulses upon being enabled which are of sufficient magnitude to assure safe turn-on of the power rated thyristor means, said gating signal generator means being energized from said low voltage direct current power supply means and having the output thereof coupled to and controlling turn-on of the power rated thyristor means, control switch means coupled to and controlling operation of the gating signal generator means, direct current bias circuit means supplied from said low voltage direct current power supply means and connected to and supplying direct current bias potential to said control switch means, and common differentiating circuit means supplied with said first high frequency alternating current gate controlling signal voltage and said second alternating current gate controlling signal voltage and supplying the differentiated output thereof in common to said control switch means to control the operation of the control switch means in conjunction with the direct current bias potential whereby zero point switching during initial turn-on of the thyristor means is achieved at or near the zero points of the high voltage undulating excitation potential to provide unity power factor operation of the induction heating unit power supply with unity form factor and nearly sinusoidal line current supply is drawn for all all values of loading from no-load to full-load without requiring substantial supply line filtering components.

45. An induction heating unit power supply according to claim 44 further including delay means coupled to said control switch means for delaying enabling action of said first control switch means upon initial turn-on of the induction heating unit power supply whereby premature firing of the power rated thyristor me.ins is prevented in advance of sufficient commutating energy being stored in the commutating reactive components of the circuit.

46. An induction heating unit power supply according to claim 45 further including second delay means connected to said control switch means for delaying prolonged turn-off of said thyristor means beyond high frequency operating cycle of the inverter circuit means until a zero point of the high voltage undulating excitation potential occurs.

47. An induction heating unit including in combination inverter circuit means comprising gate controlled thyristor means and commutation circuit means coupled together in circuit relationship and connected to a set of power supply terminals for supply from a source of excitation potential, an induction heating coil coupled to and excited by said inverter circuit means in a manner such that the induction heating coil determines at least in part the operating frequency at which the inverter circuit means operates, and gating circuit means coupled to and controlling turn-on of said gate controlled thyristor means, said gating circuit means comprising feedback sensing circuit means coupled to said induction heating coil for sensing the voltage thereof and deriving a feedback trigger signal synchronized with the frequency of operation of the inverter circuit means as established by the loading condition of the induction heating coil, gating signal generator means for generating high frequency signal pulses having a repetition rate determined by the operating frequency for the inverter circuit means and of sufficient energy to insure turn-on of said gate controlled thyristor means, and alternating current signal coupling circuit means intercoupling said feedback sensing circuit means with the gating signal generator means for synchronizing operation of the gating signal generator means with changes in frequency of the inverter circuit means due to loading and unloading of the induction heating coil.

48. An induction heating unit according to claim 47 wherein the alternating current signal coupling circuit means comprises differentiating circuit means for differentiating the sensed value of the voltage appearing across the induction heating coil and supplying the same back to synchronize operation of the gating signal generator means with the changes in frequency of operation of the inverter circuit means due to loading and unloading of the induction heating coil.

49. An induction heating unit according to claim 48 wherein the inverter circuit means comprises a high frequency chopper-inverter circuit means including inductor and capacitor commutating reactive components having an inductance L1 and capacitance C1, respectively, connected in series circuit relationship across the gate controlled thyristor means in parallel circuit relationship therewith and with the chopper-inverter circuit means thus comprised being connected across the set of power supply terminals for connection to the source of excitation potential through a filter inductor having an inductance L2, said commutating inductor and capacitor being tuned to series resonance at a predetermined natural commutating frequency that provides a combined thyristor conduction and commutating period $t_1$ during each cycle of operation and said gating circuit means controlling the turn-on of the gate controlled thyristor means so as to render the thyristor conductive at a controlled frequency of operation that provides an operation period T for the chopper-inverter circuit means including a quiescent charging period $t_2$ in each cycle of operation where $T = t_1 + t_2$ such that the value $\omega_2 t_2$ equals substantially $\pi/2$ radians at the operation frequency or greater and where $\omega_2$ equals $$\sqrt{\frac{1}{L_2 C_1}}$$

whereby the reapplied forward voltage across the thyristor means following each conduction interval is maintained substantially independent of load.

50. An induction heating unit according to claim 48 further including a smoothing inductor having an inductance L3 and a smoothing capacitor having a capacitance C3 connected in series circuit relationship across at least one of the capacitor and inductor commutating reactive components, said smoothing inductor and capacitor having values such that the combined reactive impedance of the capacitor commutating reactive component including the smoothing inductor and the smoothing capacitor is capacitive in nature and series resonates with the inductor commutating components to establish the combined thyristor conduction-commutating period $t_1$, and wherein the smoothing inductor and capacitor shape the output current flowing through the smoothing inductor to substantially a sinusoidal wave shape having little or no radio frequency interference emission effects, and the smoothing inductor comprises the induction heating coil.

51. Am improved induction cooking unit power supply comprising inverter circuit means including gate controlled power thyristor means coupled to and supplying an induction heating coil load with periodic energization currents, means for supplying high voltage excitation potential for said inverter circuit means, gating control means for developing gating signal pulses for application to the control gate of a gate controlled power thyristor means comprising a part of the inverter circuit means, and feedback control means coupled to the induction heating coil and to the gating control means and responsive to the conductivity characteristics of the metal base cookware being inductively heated for automatically adjusting the frequency of said gating control means in response to pan loading to thereby assure safe operation of said inverter circuit means for all types of pan loads imposed on the induction heating coil.

* * * * *